US012095732B2

(12) United States Patent
Candelore

(10) Patent No.: US 12,095,732 B2
(45) Date of Patent: Sep. 17, 2024

(54) ANTI-PIRACY CONTROL BASED ON BLACKLISTING FUNCTION

(71) Applicant: SONY GROUP CORPORATION, Tokyo (JP)

(72) Inventor: Brant Candelore, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 453 days.

(21) Appl. No.: 17/363,558

(22) Filed: Jun. 30, 2021

(65) Prior Publication Data

US 2023/0006971 A1  Jan. 5, 2023

(51) Int. Cl.
*H04L 9/40* (2022.01)
(52) U.S. Cl.
CPC ...... *H04L 63/0254* (2013.01); *H04L 63/0236* (2013.01); *H04L 63/1425* (2013.01)
(58) Field of Classification Search
CPC ............. H04L 63/0254; H04L 63/0236; H04L 63/1425
USPC .......................................................... 726/13
See application file for complete search history.

(56) References Cited

U.S. PATENT DOCUMENTS

| | | | | |
|---|---|---|---|---|
| 9,083,733 | B2 * | 7/2015 | Georgiev | H04L 63/101 |
| 10,205,992 | B2 * | 2/2019 | Ying | H04N 21/41407 |
| 10,608,983 | B2 | 3/2020 | Prince et al. | |
| 10,880,322 | B1 * | 12/2020 | Jakobsson | H04L 51/08 |
| 2020/0184043 | A1 | 6/2020 | Li | |
| 2021/0067558 | A1 * | 3/2021 | Ni | H04L 41/14 |
| 2022/0060490 | A1 * | 2/2022 | Farshteindiker | H04L 63/1458 |

(Continued)

FOREIGN PATENT DOCUMENTS

| | | |
|---|---|---|
| EP | 3687139 A2 | 7/2020 |
| WO | WO-2016040753 A1 | 3/2016 |

OTHER PUBLICATIONS

"ESET Smart TV Security", Google Play Store, Version 1.5.1.0, URL: https://play.google.com/store/apps/details?d=com.eset.etvs.gp&hl=en_US&gl=US, Nov. 24, 2020, 04 pages.

(Continued)

*Primary Examiner* — Piotr Poltorak
*Assistant Examiner* — Saad Ahmad Abdullah
(74) *Attorney, Agent, or Firm* — CHIP LAW GROUP

(57) ABSTRACT

An electronic device is provided for control of an execution of a third-party application based on a blacklisting function. The electronic device includes circuitry that executes a monitor application that is a part of an operating system rooted onto the electronic device. The monitor application has system privileges to examine the code and execution of the third-party application installed on the electronic device. The circuitry identifies, by the monitor application, one or more requests to access a network resource from a runtime code of the third-party application. The circuitry extracts, by the monitor application, one or more first network resource identifiers associated with the network resource from the one or more requests. The circuity compares, by the monitor application, the first network resource identifiers with the blacklist associated with the monitor application. The circuitry controls, by the monitor application, the execution of the third-party application based on the comparison.

19 Claims, 11 Drawing Sheets

(56) References Cited

U.S. PATENT DOCUMENTS

2022/0067146 A1* 3/2022 Cai ...................... G06F 21/566
2023/0188424 A1* 6/2023 Xin .................... H04L 63/0236
                                                        709/223

OTHER PUBLICATIONS

"Network Interface", Android Developers, URL: https://developer.android.com/reference/java/net/NetworkInterface, Jun. 9, 2021, 19 pages.
"StealthTV Pirate Application", Sony, Sony Home Entertainment and Sound Products Inc, Dec. 17, 2020, 14 pages.

* cited by examiner

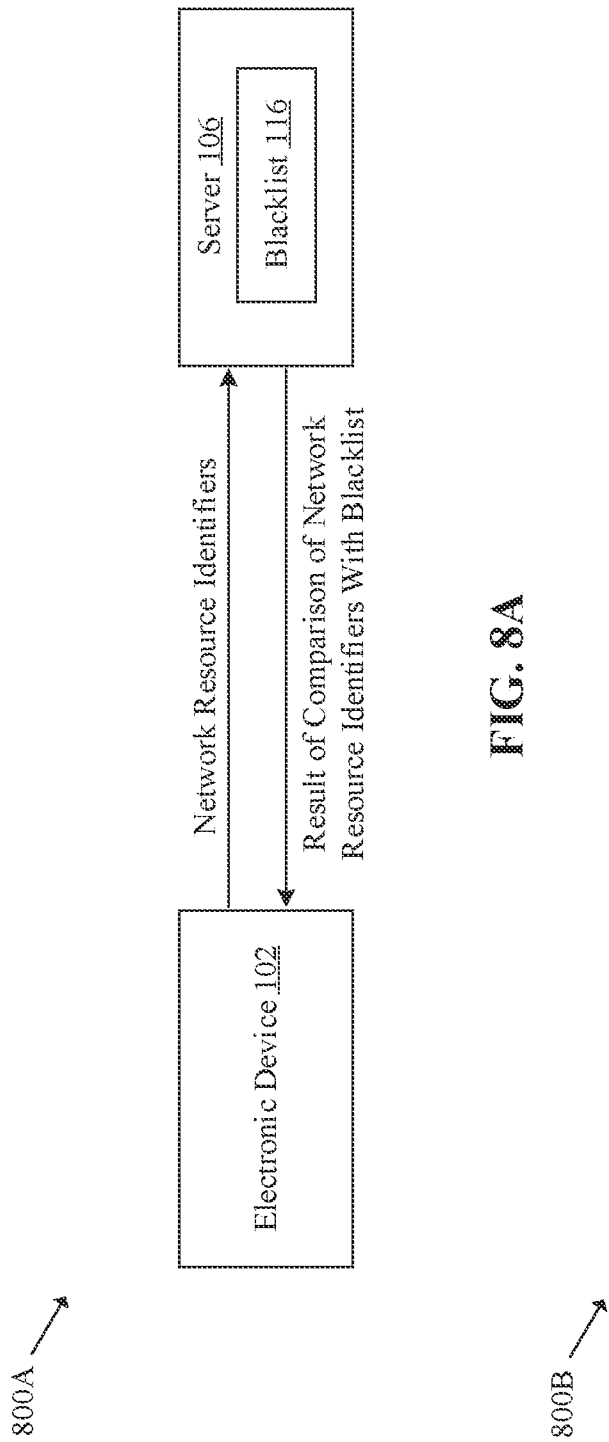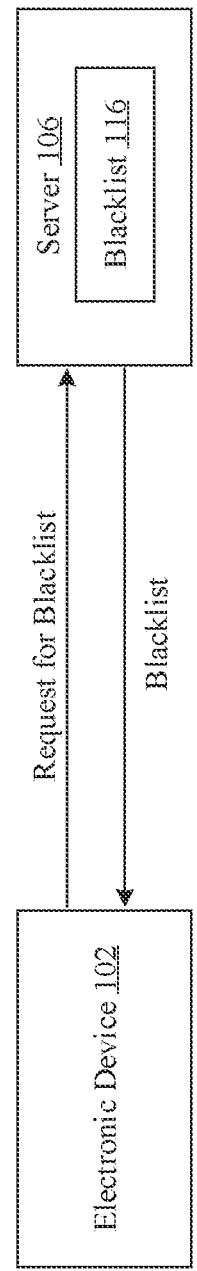

ANTI-PIRACY CONTROL BASED ON BLACKLISTING FUNCTION

CROSS-REFERENCE TO RELATED APPLICATIONS/INCORPORATION BY REFERENCE

None.

FIELD

Various embodiments of the disclosure relate to anti-piracy control. More specifically, various embodiments of the disclosure relate to an electronic device and method for control of execution of a third-party application for anti-piracy control based on a blacklisting function.

BACKGROUND

Recent advancements in the field of streaming media services (such as over-the-top media service or video-on-demand service) and streaming devices (such as digital media players and smart televisions) have led to the development of various applications (such as player applications) that provide high-definition content on media rendering devices (such as television, mobile screen, etc.). These player applications may include pre-installed applications and/or third-party applications installed on a streaming device (such as the digital media player or the smart television). Each of the player applications may control streaming and playback of the content (such as a television show, a movie, or audio content) in high-definition quality from a respective streaming media service (such as Google Play®, Netflix®, Amazon Prime Video®, or HBO Max®, Sony®, Disney+®, etc.). In some scenarios, the streaming device may allow third-party applications (such as a player application) to be downloaded from unknown sources to provide flexibility to a device user. In other instances, the third-party applications may sideloaded or downloaded indirectly, although such applications may be banned from legitimate sources (such as Google Play® Store). However, some of these third-party applications may include pirate applications that may acquire content from rogue websites to stream pirated content onto the streaming device. In such scenarios, the pirate applications may provide premium content to the streaming device without authorization, and may subvert the services of legitimate content providers (such as Google Play®, Netflix®, Amazon Prime Video®, or HBO Max®, Sony®, Disney+®, etc.). The unauthorized access to premium content may violate the rights of copyright holders and content creators who rely on legitimate subscription-based access to their content for revenue.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for anti-piracy control of a third-party application based on a blacklisting function, that is part of an operating system of the electronic device, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIGS. 8A and 8B are block diagrams that illustrate exemplary operations for comparison of network resource identifiers with a blacklist, in accordance with an embodiment of the disclosure.

DETAILED DESCRIPTION

Figure 1:
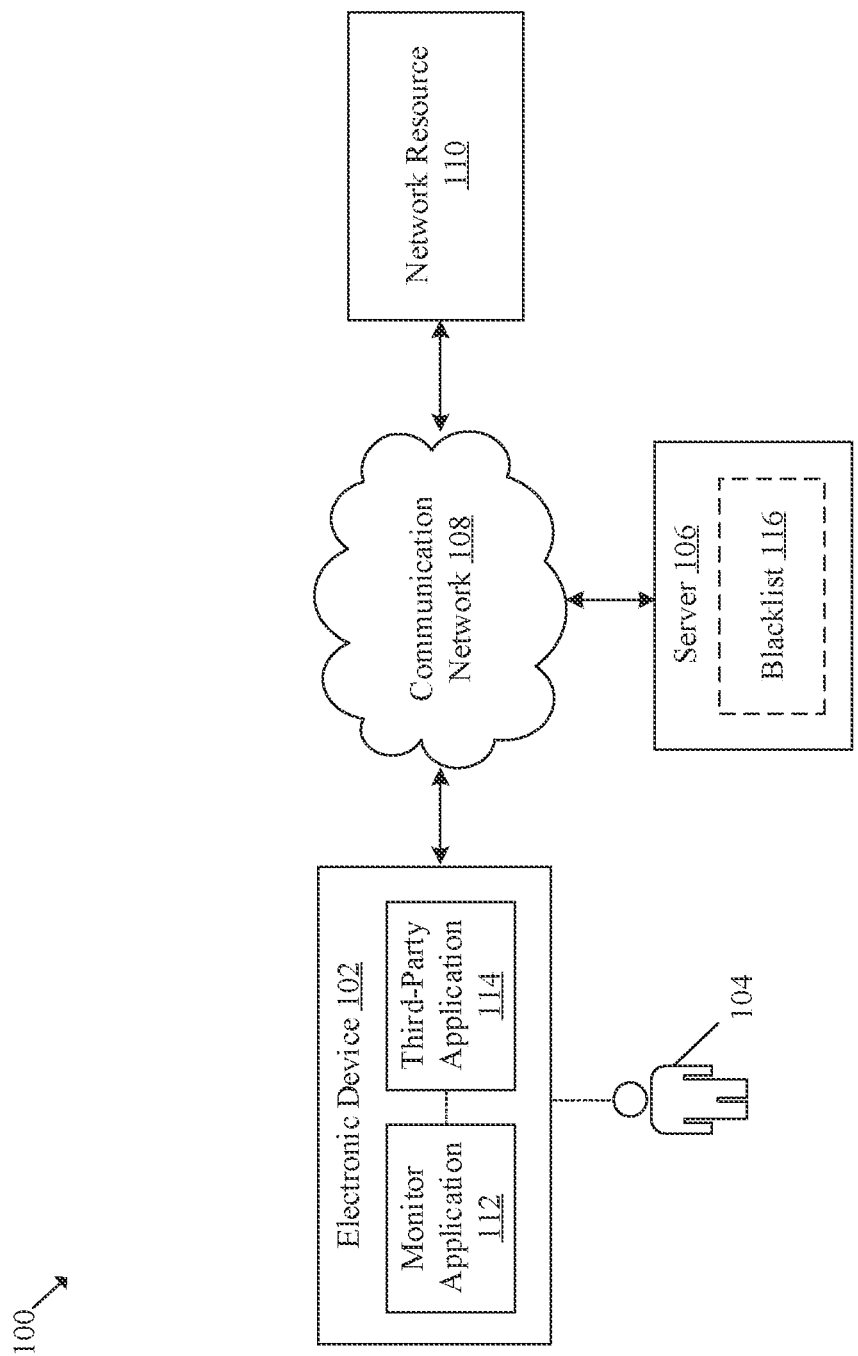
FIG. 1 is a block diagram that illustrates an exemplary network environment for control of execution of a third-party application for anti-piracy control based on a blacklisting function, in accordance with an embodiment of the disclosure.

The following described implementations may be found in the disclosed electronic device (such as a smart television or a digital media player) and method for anti-piracy control of a third-party application based on a blacklisting function that is part of an operating system of the electronic device. The third-party application may be a player application configured to stream content (such as video content or audio content). Exemplary aspects of the disclosure provide the electronic device that may execute a monitor application.

The monitor application may be a part of the operating system (OS) of the electronic device. The electronic device may identify, by the monitor application, one or more requests to access a network resource (such as a media server or a network location) from the third-party application installed on the electronic device. The monitor application may have privileged access permission to read a runtime code and/or decrypted executable memory space of the third-party application. The monitor application may identify the one or more requests from the runtime code of the third-party application. In another embodiment, the monitor application may intercept the one or more requests at a network interface of the electronic device. The electronic device may extract, by the monitor application, one or more first network resource identifiers (such as uniform resource locators (URLs)) associated with the network resource from the one or more requests. The electronic device may compare, by the monitor application, the one or more first network resource identifiers with a blacklist associated with the monitor application. The blacklist may comprise at least one of a list of malicious internet protocol (IP) addresses or a list of malicious domain names. The electronic device may further control, by the monitor application, an execution of the third-party application based on the comparison of the one or more first network resource identifiers with the blacklist.

In an embodiment, the electronic device may determine that the network resource, accessed by the third-party application, is a malicious resource based on the comparison between the one or more first network resource identifiers and the blacklist. The electronic device may determine that the content associated with the network resource is pirated content based on the comparison. The electronic device may further terminate or suspend the execution of the third-party application (such as a pirate application) based on the determination that the network resource is the malicious resource. The electronic device may thereby prevent the third-party application (such as a pirate application) from streaming premium content to the electronic device without authorization or legitimate subscription, and may protect the rights of copyright holders and content creators who rely on legitimate subscription-based access to their content for revenue.

In another embodiment, the electronic device may control a bandwidth available to the third-party application to stream content from the network resource based on the comparison of the one or more first network resource identifiers with the blacklist. For example, the electronic device may control the bandwidth available to the third-party application in case the one or more first network resource identifiers are present in the blacklist. The electronic device may control the bandwidth available to the third-party application to reduce a quality of the content streamed by the third-party application or to increase a buffering time of the content. The electronic device may further control a performance (such as irregular pausing of playback of the content by the third-party application) of the third-party application or interrupt playback of the content based on the comparison. The electronic device may thereby degrade the usability of the third-party application in case the third-party application streams pirated content from the malicious network resource, and may thereby discourage users from using the third-party application. The electronic device may degrade the usability of the third-party application in such a way that the users may be led to believe that the third-party application and its service are inferior, and may not realize that the monitor application has caused the degradation.

In another embodiment, the electronic device may analyze a specific program code (such as a source code) of the third-party application and may determine a type of the third-party application based on the analysis of the specific program code of the third-party application. The electronic device may determine that the type of the third-party application is a player application that streams the content from the network resource to the electronic device. The electronic device may compare the one or more first network resource identifiers with the blacklist based on the determination that the type of the third-party application is the player application. The electronic device may control the execution of the third-party application based on the comparison of the one or more first network resource identifiers with the blacklist. The electronic device may thereby effectively monitor the third-party application for malicious behavior based on the type of the third-party application.

In another embodiment, the electronic device may extract one or more second network resource identifiers (such as URLs) from the one or more requests during the stream of the content. The electronic device may extract the one or more second network resource identifiers after a specific period of time from the extraction of the one or more first network resource identifiers. The electronic device may compare the one or more second network resource identifiers with the blacklist. The electronic device may control (terminate or suspend or degrade) the execution of the third-party application based on the comparison of the one or more second network resource identifiers with the blacklist. The electronic device may thereby periodically and effectively monitor the third-party application for malicious behavior after every specific period of time during the execution of the third-party application.

FIG. 1 is a block diagram that illustrates an exemplary network environment for control of execution of a third-party application for anti-piracy control based on a black-listing function, in accordance with an embodiment of the disclosure. With reference to FIG. 1, there is shown a network environment 100. In the network environment 100, there is shown an electronic device 102, a server 106, and a network resource 110. In the network environment 100, there is shown a communication network 108. The server 106 and the network resource 110 may be communicatively coupled to the electronic device 102 through the communication network 108. The electronic device 102 may be associated with a user 104. The electronic device 102 may include a monitor application 112 and a third-party application 114. The server 106 may store a blacklist 116.

The electronic device 102 may comprise suitable logic, circuitry, and interfaces that may be configured to execute the monitor application 112 and the third-party application 114. The electronic device 102 may identify, by the monitor application 112, one or more requests to access the network resource 110 from the third-party application 114 installed on the electronic device 102. The monitor application 112 of the electronic device 102 may identify the one or more requests from a runtime code of the third-party application 114. The monitor application 112 may have privileged access permission to read the runtime code of the third-party application 114. The electronic device 102 may extract, by the monitor application 112, one or more first network resource identifiers associated with the network resource 110 from the one or more requests. The electronic device 102 may compare, by the monitor application 112, the one or more first network resource identifiers with a blacklist 116 associated with the monitor application 112. The electronic device 102 may control, by the monitor application 112, an execution of the third-party application 114 based on the comparison. Details of the control of the execution of the third-party application 114 are further described, for example, in FIGS. 4A, 4B, 5-7, 8A, 8B, 9A, 9B, and 10. Examples of the electronic device 102 may include, but are not limited to, a smart television (TV), a digital media player, a set-top box (STB), a streaming media player, a three-dimensional (3D) display device, a free viewpoint TV, a computing device, an e-paper based display device, a media processing system, a new form factor (NFF) television, a mobile device, a tablet computer, a computing device, a computer workstation, a mainframe computer, a handheld computer, a smartphone, a cellular phone, a mobile phone, a gaming device, a server, or other consumer electronic (CE) device capable of execution of the third-party application 114 (such as a player application) that streams content. Examples of the content that may be played by the electronic device 102 may include, but are not limited to, streaming content, stored content, over-the-air content, video content, audio content, audio-video content, gaming content, three-dimensional (3D) content, 360-degree video content, and so on. The format of the content may include, but is not limited to, moving picture experts' group (MPEG) format, advanced video coding (AVC), high-efficiency video coding (HEVC), flash video (FLV), MPEG-dynamic adaptive streaming over HTTP (MPEG-DASH), and other audio and video coding formats. In an embodiment, the electronic device may receive and store a local version of the blacklist 116 from the server 106. The blacklist 116 may comprise at least one of a list of malicious internet protocol (IP) addresses or a list of malicious domain names. The blacklist 116 may be stored on the electronic device 102 in an encrypted state in order to frustrate the analysis of pirates who might purchase the electronic device 102 and attempt to reverse-engineer the electronic device 102 to access the blacklist 116, in order to identify which URLs have been discovered by the authorities and compromised.

The server 106 may include suitable logic, circuitry, and interfaces, and/or code that may be configured to store the blacklist 116. The blacklist 116 may comprise at least one of a list of malicious internet protocol (IP) addresses, a list of URLs, or a list of malicious domain names associated with malicious network resources (such as the network resource 110). The server 106 may periodically update the blacklist 116 based on data received from a plurality of electronic devices (such as the electronic device 102). In an embodiment, the server 106 may transmit the updated blacklist 116 to the electronic device 102 based on a request from the electronic device 102. In an embodiment, the server 106 may transmit the updated blacklist 116 as a real-time update to the electronic device 102. In another embodiment, the server 106 may receive one or more first network resource identifiers (such as URLs) from the electronic device 102. The server may compare the one or more first network resource identifiers with the stored blacklist 116, and transmit a result of the comparison to the electronic device 102. The server 106 may include a database to store the blacklist 116. The server 106 may include one or more processors configured to execute high-computation tasks, such as, blacklist comparison, blacklist updating, machine learning, and so on. In an exemplary embodiment, the server 106 may be implemented as a cloud server and may execute operations through web applications, cloud applications, HTTP requests, repository operations, file transfer, and the like.

Other example implementations of the server 106 may include, but are not limited to, a database server, a file server, a web server, an application server, a mainframe server, or a cloud computing server.

The communication network 108 may include a communication medium through which the electronic device 102 may communicate with the server 106, and/or the network resource 110. The communication network 108 may be one of a wired connection or a wireless connection. Examples of the communication network 108 may include, but are not limited to, a Wireless Fidelity (Wi-Fi) network, a Local Area Network (LAN), a Personal Area Network (PAN), a Wireless Personal Area Network (WPAN), a Wireless Local Area Network (WLAN), a Wireless Wide Area Network (WWAN), a cloud network, a Long Term Evolution (LTE) network, a Metropolitan Area Network (MAN), and/or the Internet. Various devices in the network environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, IEEE 802.16, Long Term Evolution (LTE), light fidelity (Li-Fi), multi-hop communication, wireless access point (AP), device to device communication, cellular communication protocols, and Bluetooth (BT) communication protocols. In an embodiment, the electronic device 102 may acquire the blacklist 116 from the server 106 or may acquire media content from the network resource 110 via the communication network 108.

The network resource 110 may include suitable logic, circuitry, and interfaces, and/or code that may be configured to store media content. Examples of the network resource 110 may include, but are not limited to, a media server, a database of the content (such as audio content or video content), a network location (such as a content delivery network (CDN)) referred by the one or more first network resource identifiers, and so on. The third-party application 114 may access the network resource 110 through the one or more first network resource identifiers that may refer to the media content stored on the network resource 110. The network resource 110 may host a media service to which one or more users may subscribe. The network resource 110 may store one or more user accounts associated with the one or more subscribed users, which may define and control the subscription plan, access level to content, streaming quality, and so on for each subscribed user. The network resource 110 may include a set of databases along with suitable network interfaces and sufficient bandwidth to allow multiple clients (such as the electronic device 102) to stream content. The network resource 110 may store content in various formats, and may allow access to a set of content (such as premium content) though premium subscription only. In an exemplary embodiment, the network resource 110 may be implemented as a cloud server and may execute operations through web applications, cloud applications, HTTP requests, repository operations, file transfer, and the like. Other example implementations of the network resource 110 may include, but are not limited to, a database server, a file server, a web server, a media server, an application server, a mainframe server, or a cloud computing server. In an embodiment, the network resource 110 may be a malicious resource that may allow users to access pirated content corresponding to premium content at considerably lower prices compared to premium membership access through legitimate content providers.

The monitor application 112 may be part of the operating system (for example, the kernel) of the electronic device 102. The monitor application 112 may be a part of the operating system rooted onto the electronic device 102, making it difficult for a user to disable the monitor application 112 without also disabling the operating system of the electronic device 102 and preventing the electronic device 102 from operating. As part of the operating system, the monitor application 112 may have system privileges to examine the code and execution of third-party applications (such as the third-party application 114) installed on the electronic device 102. The monitor application 112 may be pre-installed by a manufacturer of the electronic device 102. The monitor application 112 may have privileged access permission to read the runtime code and/or encrypted memory space that has been decrypted for execution of the third-party application 114 to identify one or more requests to access the network resource 110 from the third-party application 114. For example, the privileged access permission may comprise root access on the electronic device 102. With the monitor application 112 having root access on the electronic device 102, it may be difficult for a hacker to un-root the electronic device 102 in order to install an alternative operating system. The monitor application 112 may also be configured to determine whether an alternate network interface has been installed along with the third-party application 114 (such as a pirate application). In an embodiment, the monitor application 112 may be configured to read a specific program code of the third-party application to determine that a type of the third-party application is a player application. The monitor application 112 may be further configured to read the runtime code and/or decrypted executable memory space of the third-party application 114 during the execution of the third-party application 114. In an embodiment, the monitor application 112 may be configured to intercept the one or more requests at a network interface of the electronic device 102. In an embodiment, the monitor application 112 may include a local version of the blacklist 116, and may implement the blacklisting function at the network interface of the electronic device 102. The monitor application 112 may determine whether the third-party application 114 is malware based on the signature of the third-party application 114. In another embodiment, the monitor application 112 may determine whether the third-party application 114 is malware based on one or more first network resource identifiers (such as URLs) extracted from the one or more requests from the third-party application 114. The monitor application 112 may have privileges to control the execution (such as terminate, suspend, or control performance) of the third-party application on the electronic device 102.

The third-party application 114 may be a player application configured to stream content (such as media content) onto the electronic device 102 from the network resource 110. The third-party application 114 may access the content on the network resource 110 using the one or more network resource identifiers (such as URLs) in response to user input for playback of the content. The third-party application 114 may generate a graphical user interface for display, and may receive user inputs via the graphical user interface. In case the electronic device 102 (such as a smart television) includes an integrated display screen, the third-party application 114 may cause the graphical user interface to be displayed on the integrated display screen. In case the electronic device 102 (such as a digital media player or a personal video recorder) is connected to an external rendering device, the third-party application 114 may cause the graphical user interface to be displayed on the external rendering device (such as an external display screen). For example, the graphical user interface may include a plurality of menu icons related to playback control of the content. The graphical user interface may further include a plurality of icons that may be navigated for selection of the content to be played by the third-party application 114. The third-party application may also include suitable plugins to play content of various formats. Examples of the content that may be streamed by the third-party application 114 may include, but are not limited to, streaming content, over-the-air content, video content, audio content, audio-video content, three-dimensional (3D) content, 360-degree video content, gaming content, and so on. The various formats of the content rendered by the third-party application 114 may include, but are not limited to, moving picture experts' group (MPEG) format, advanced video coding (AVC), high-efficiency video coding (HEVC), flash video (FLV), MPEG-dynamic adaptive streaming over HTTP (MPEG-DASH), and other audio and video coding formats. Examples of the third-party application 114 may include, but are not limited to, a video player application, an audio player application, a media player application, a 3D content player application, and so on.

In operation, the electronic device 102 may execute a monitor application 112 during installation and/or execution of the third-party application 114 (such as a player application). The monitor application 112 may be a part of the operating system (OS) of the electronic device 102. In such scenarios, the monitor application 112 may detect that the third-party application 114 is being installed and/or being executed on the electronic device 102. Based on the detection of the installation, the monitor application 112 may read a code thread of the third-party application 114 to determine a signature of the third-party application during the installation, while the code thread is accessible from a public input data buffer of the electronic device 102. The monitor application 112 may determine whether the third-party application 114 is a pirate application based on whether the signature of the third-party application 114 is similar to known pirate applications. The monitor application 112 may prevent installation of the third-party application 114 based on the determination that the third-party application 114 is the pirate application.

In case the signature of the third-party application 114 is not similar to known pirate applications, the monitor application 112 may allow the installation and execution of the third-party application 114. Based on the execution of the third-party application 114, the electronic device 102 may determine whether the type of the third-party application 114 is a player application that streams the content from the network resource 110 to the electronic device 102. Based on the determination that the type of the third-party application 114 is the player application, the electronic device 102 may identify one or more requests to access the network resource 110 (such as a content delivery network) from the third-party application 114. The monitor application 112 may read a runtime code of the third-party application 114. Based on the runtime code of the third-party application 114, the electronic device 102 may identify the one or more requests from the third-party application 114. The electronic device 102 may extract one or more first network resource identifiers (such as URLs) associated with the network resource 110 from the one or more requests. The electronic device 102 may further compare the one or more first network resource identifiers with a blacklist 116 associated with the monitor application 112. The electronic device 102 may control (such as terminate or suspend or degrade) an execution of the third-party application 114 based on a result of comparison of the one or more first network resource identifiers with the blacklist 116. For example, the electronic device 102 may terminate or suspend or degrade the execution of the third-party application 114 in a case where the one or more first network resource identifiers (such as URLs) are present in the blacklist 116.

In an embodiment, the electronic device 102 may further determine that the network resource 110 is a malicious resource associated with pirated content based on the determination that the one or more first network resource identifiers is present in the blacklist 116. The electronic device 102 may terminate or suspend the execution of the third-party application 114 based on the determination that the network resource 110 is the malicious resource. The electronic device 102 may thereby prevent the third-party application 114 (such as a pirate application) from streaming premium content to the electronic device 102 without authorization or legitimate subscription, and may protect the rights of copyright holders and content creators who rely on legitimate subscription-based access to their content for revenue. Details of the control of the execution of the third-party application 114 based on the blacklist 116 are described, for example, in FIGS. 4A, 4B, and 5.

In another embodiment, the electronic device 102 may control a bandwidth available to the third-party application to stream content from the network resource 110 based on the comparison of the one or more first network resource identifiers with the blacklist 116. For example, the electronic device 102 may control the bandwidth available to the third-party application 114 in case the one or more first network resource identifiers are present in the blacklist 116. The electronic device 102 may control the bandwidth available to the third-party application 114 to reduce a quality of the content streamed by the third-party application 114 or to increase a buffering time of the content. The electronic device 102 may further degrade a performance (such as irregular pausing of playback of the content by the third-party application 114) of the third-party application 114 or interrupt playback of the content based on the comparison. The electronic device 102 may thereby degrade the usability of the third-party application 114 in case the third-party application 114 streams pirated content from the network resource 110 (such as the malicious network resource), and may thereby discourage users from using the third-party application 114. The electronic device 102 may degrade the usability of the third-party application 114 in such a way that users may be led to believe that the third-party application 114 and its service are inferior, and may not realize that the monitor application 112 has caused the degradation. Details of the control of the bandwidth available to the third-party application 114 based on the detection of the pirated content are described, for example, in FIGS. 4A, 4B, 5, 9A, and 9B.

In another embodiment, the electronic device 102 may analyze a specific program code (such as a source code) of the third-party application 114 and may determine that a type of the third-party application 114 based on the analysis of the specific program code of the third-party application 114. For example, the electronic device 102 may determine that the type of the third-party application 114 is a player application that streams the content from the network resource 110 to the electronic device 102. The electronic device 102 may compare the one or more first network resource identifiers with the blacklist 116 based on the determination that the type of the third-party application 114 is the player application. The electronic device 102 may control the execution of the third-party application 114 based on the comparison of the one or more first network resource identifiers with the blacklist 116. The electronic device 102 may thereby effectively monitor the third-party application 114 for malicious behavior based on the type of the third-party application 114. Details of the control of the execution of the third-party application 114 based on the type of the third-party application 114 are described, for example, in FIGS. 4A, 4B, and 5

In another embodiment, the electronic device 102 may extract one or more second network resource identifiers (such as URLs) from the one or more requests during the stream of the content. The electronic device 102 may extract the one or more second network resource identifiers after a specific period of time from the extraction of the one or more first network resource identifiers. The electronic device 102 may compare the one or more second network resource identifiers with the blacklist 116. The electronic device 102 may control (terminate or suspend or degrade) the execution of the third-party application 114 based on the comparison of the one or more second network resource identifiers with the blacklist 116. The electronic device 102 may thereby periodically and effectively monitor the third-party application 114 for malicious behavior after every specific period of time during the execution of the third-party application 114. Details of the control of the execution of the third-party application 114 based on the comparison of the one or more second network resource identifiers with the blacklist 116 are described, for example, in FIG. 7.

The electronic device 102 may determine whether the third-party application 114 switches between the one or more first network resource identifiers of the plurality of distributed network resource identifiers and a second network resource identifier of the plurality of distributed network resource identifiers. For example, the electronic device 102 may determine that the network resource 110 is changed from one network resource to another network resource during the execution of the third-party application 114. The electronic device 102 may control (terminate or suspend) the execution of the third-party application 114 based on the switch between the one or more first network resource identifiers and the second network resource identifier. The electronic device 102 may determine that the content associated with the third-party application 114 (such as a player application) is pirated content in a case where the third-party application 114 switches between the one or more first network resource identifiers and the second network resource identifier. In an embodiment, the electronic device 102 may determine a change from a first network interface of the electronic device 102 to a second network interface (such as an alternate network interface installed along with the third-party application 114) by the third-party application 114. The circuitry 202 may control the execution of the third-party application 114 based on the determined change. Details of the control the execution of the third-party application 114 based on the switch between the one or more first network resource identifiers and the second network resource identifier are described, for example, in FIG. 10.

Figure 2:
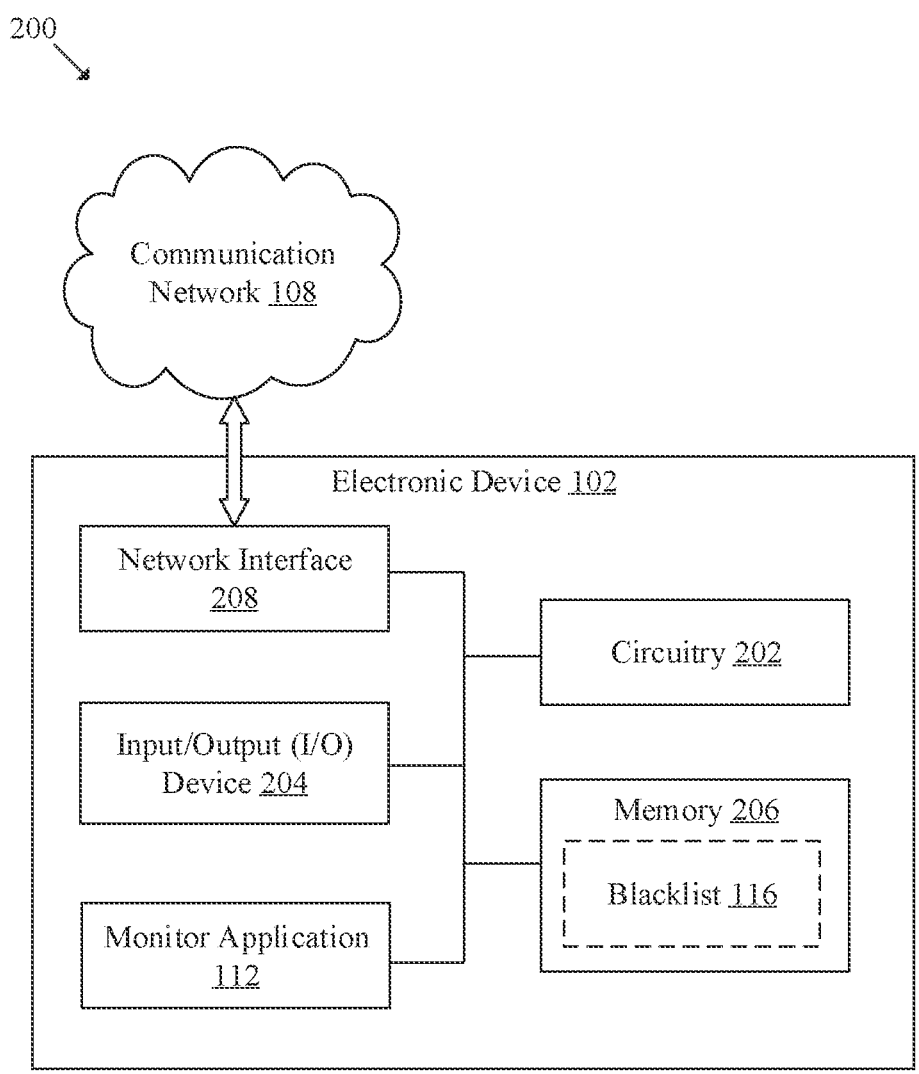
FIG. 2 is a block diagram that illustrates an exemplary electronic device for control of execution of a third-party application, in accordance with an embodiment of the disclosure.

FIG. 2 is a block diagram that illustrates an exemplary electronic device for control of execution of a third-party application, in accordance with an embodiment of the disclosure. FIG. 2 is explained in conjunction with elements from FIG. 1. With reference to FIG. 2, there is shown a block diagram 200 of an electronic device 102. The electronic device 102 may include circuitry 202, an Input/Output (I/O)

device 204, a memory 206, a network interface 208, and a monitor application 112. The memory 206 may include a local version of the blacklist 116. The circuitry 202 may be communicatively coupled to the I/O device 204, the memory 206, the network interface 208, and the monitor application 112. The circuitry 202 may communicate with the communication network 108 via the network interface 208.

The circuitry 202 may include suitable logic, circuitry, and interfaces that may be configured to execute program instructions associated with different operations to be executed by the electronic device 102. For example, some of the operations may include execution of the monitor application 112, identification of the one or more requests from the third-party application 114, extraction of the one or more first network resource identifiers, comparison of the one or more first network resource identifiers with the blacklist 116, control of the execution of the third-party application 114 based on the comparison. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The I/O device 204 may include suitable logic, circuitry, and interfaces that may be configured to receive one or more user inputs (such as playback commands) through a remote control associated with the electronic device 102, and may render output (such as blinking LED lights) in response to the received user inputs. In an embodiment, the I/O device 204 may include one or more playback control buttons and an integrated display screen. In another embodiment, the I/O device 204 may display a graphical user interface generated by the third-party application 114, and may receive user inputs via the graphical user interface. In case the electronic device 102 (such as a smart television) includes an integrated display screen (not shown), the electronic device 102 may cause the graphical user interface to be displayed on the integrated display screen. For example, the graphical user interface may include a plurality of menu icons related to playback control of the content by the third-party application 114. The graphical user interface may further include a plurality of icons that may be navigated for selection of the content to be played on the display screen. The I/O device 204, which may include various input and output devices, may be configured to communicate with the circuitry 202. Examples of such input and output devices may include, but are not limited to, a touchscreen, a keyboard, a mouse, a joystick, a microphone, a display device, a speaker, and/or a vibration actuator. The I/O device 204 may include a touch screen display which may receive a user input by touch input. The touch screen may be at least one of a resistive touch screen, a capacitive touch screen, or a thermal touch screen. The touch screen display may be realized through several known technologies such as, but not limited to, at least one of a Liquid Crystal Display (LCD) display, a Light Emitting Diode (LED) display, a plasma display, or an Organic LED (OLED) display technology, or other display devices.

The memory 206 may include suitable logic, circuitry, and interfaces that may be configured to store one or more instructions to be executed by the circuitry 202. In an embodiment, the memory 206 may be configured to store a local version of the blacklist 116. The blacklist 116 may be a list of IP addresses or a list of malicious domain names associated with the network resource 110. For example, the circuitry 202 may receive the blacklist 116 from the server 106 and store the blacklist 116 in the memory 206. In an embodiment, the memory 206 may be configured to store the program code of the third-party application 114. The program code may be a source code of the third-party application 114 stored in an encrypted portion of the memory 206. In another example, based on the determination of the type of the third-party application 114, the memory 206 may store the type of the third-party application 114. The memory may further store the one or more first network resource identifiers and the second network resource identifier as potential entries to the blacklist 116. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 208 may include suitable logic, circuitry, and interfaces that may be configured to facilitate communication between the electronic device 102, the server 106, and the network resource 110. The electronic device 102 may receive the content (such as streaming media content) from the network resource 110 (such as a media server) via the network interface 208. The electronic device 102 may receive the blacklist 116 from the server 106 via the network interface 208. The network interface 208 may include an infrared (IR) receiver or a Bluetooth™ transceiver to receive commands (such as execution commands, navigation commands, volume control commands, etc.) from a remote control associated with the electronic device 102. The network interface 208 may be implemented by use of various known technologies to support wired or wireless communication of the electronic device 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, a radio-frequency identification (RFID) tag, a Bluetooth™ transceiver, or a local buffer circuitry. The network interface 208 may be configured to communicate via wireless communication with networks, such as the Internet, an Intranet or a wireless network, such as a cellular telephone network, a wireless local area network (LAN), a metropolitan area network (MAN), and a satellite communication network (such as a satellite constellation). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth®, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

Although FIG. 2 illustrates the electronic device 102 includes the circuitry 202, the I/O device 204, the memory 206, the network interface 208, and the monitor application 112, the disclosure may not be limited in this regard. Accordingly, the electronic device 102 may include more or less components to perform the same or other functions of the electronic device 102. The functions or operations executed by the electronic device 102, as described in FIG. 1, may be performed by the circuitry 202. Operations executed by the circuitry 202 are described in detail, for example, in FIGS. 3, 4A, 4B, 5-7, 8A, 8B, 9A, 9B, 10, and 11.

Figure 3:
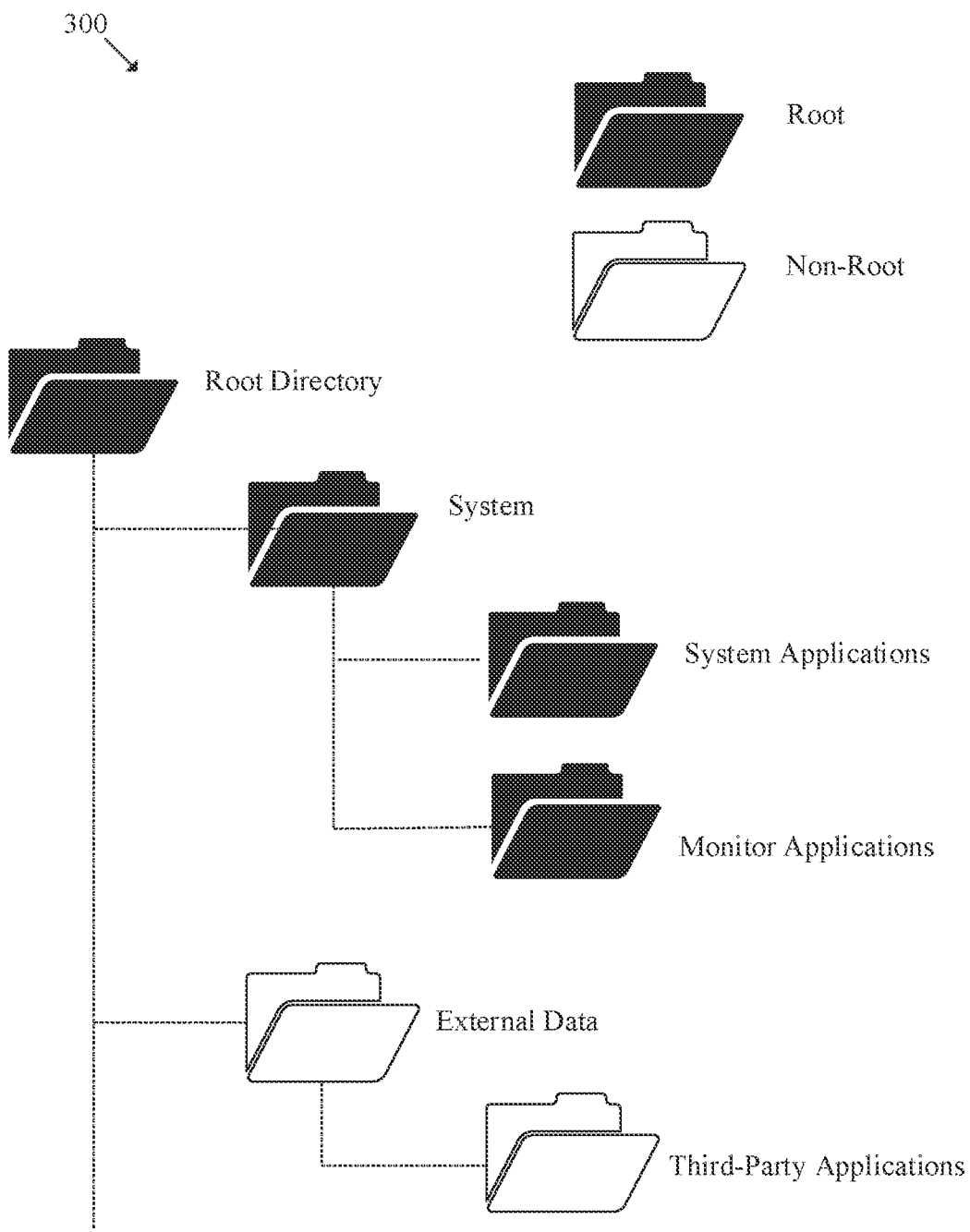
FIG. 3 illustrates a diagram of a file tree structure associated with an operating system of an electronic device, in accordance with an embodiment of the disclosure.

FIG. 3 illustrates a diagram of a file tree structure associated with an operating system of an electronic device, in accordance with an embodiment of the disclosure. FIG. 3 is explained in conjunction with elements from FIGS. 1 and 2. With reference to FIG. 3, there is shown an exemplary file tree structure 300 of the electronic device 102. In the exemplary file tree structure 300, there is shown a root directory of the electronic device 102.

In accordance with an embodiment, the root directory may include, but is not limited to, system files and/or external data. Access to the system files may require privileged access permission (such as root access privileges) and access to the external data may not require privileged access permission. The system files may include files related to critical system applications including the monitor application. In an embodiment, the system applications and the monitor application may have privileged access to read a runtime code of third-party applications (such as the third-party application 114) on the electronic device 102. The external data may include files related to the third-party application 114 (such as a player application), user data, media content, etc. The monitor application 112 may be part of the OS (such as the kernel) of the electronic device 102, and may have superuser privileges to read the runtime code and/or the decrypted executable memory space of the third-party application 114 during the execution of the third-party application 114. Based on the read runtime code and/or the decrypted executable memory space of the third-party application 114, the circuitry 202 may identify the one or more requests from the third-party application 114 to access the network resource 110.

Figure 4A:
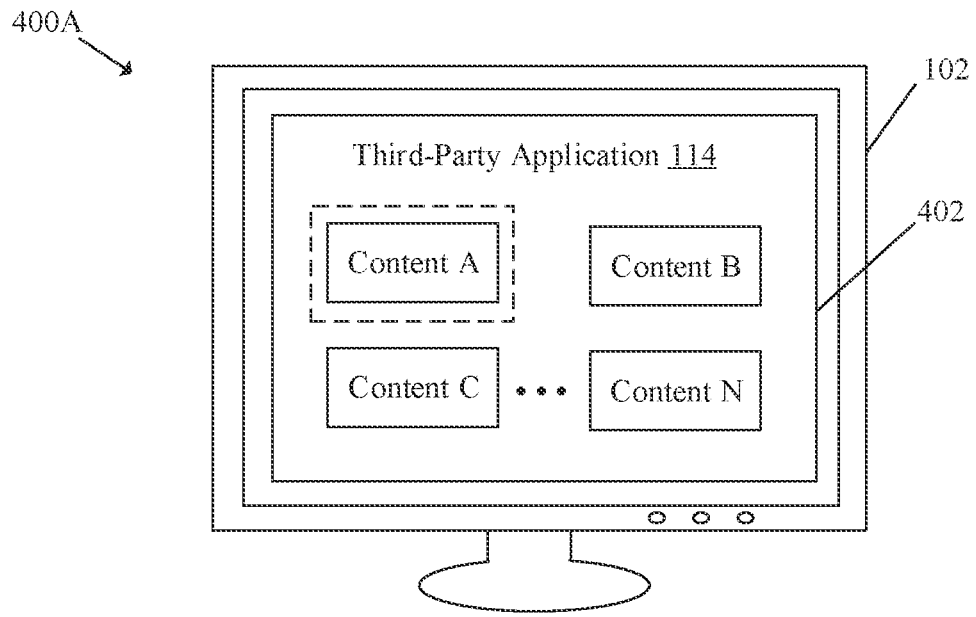
FIGS. 4A and 4B are diagrams that illustrate an exemplary scenario for execution of a third-party application on an electronic device, in accordance with an embodiment of the disclosure.

FIG. 4A is a diagram that illustrates an exemplary scenario for execution of a third-party application on an electronic device, in accordance with an embodiment of the disclosure. FIG. 4A is explained in conjunction with elements from FIGS. 1-3. With reference to FIG. 4A, there is shown exemplary scenario 400A. In the exemplary scenario 400A, there is shown the electronic device 102 (such as a smart television or a digital media player) that may control the execution of the third-party application 114 for playback of content.

In the exemplary scenario 400A, the circuitry 202 may execute the third-party application 114 to generate a graphical user interface 402. The third-party application 114 may access the content from the network resource 110 based on a playback request on the electronic device 102. In an embodiment, the circuitry 202 may be configured to display the graphical user interface 402 generated by the third-party application 114. The graphical user interface 402 may include a plurality of icons that may be navigated for selection of a content item among a plurality of content items (such as content A, content B, content C, up to content N) to be played by the third-party application 114 based on user input. For example, the circuitry 202 may receive the user input to select content A for streaming playback (as highlighted in FIG. 4A). Examples of the content A may include, but are not limited to, video content, audio content, audio-video content, and so on.

Figure 4B:
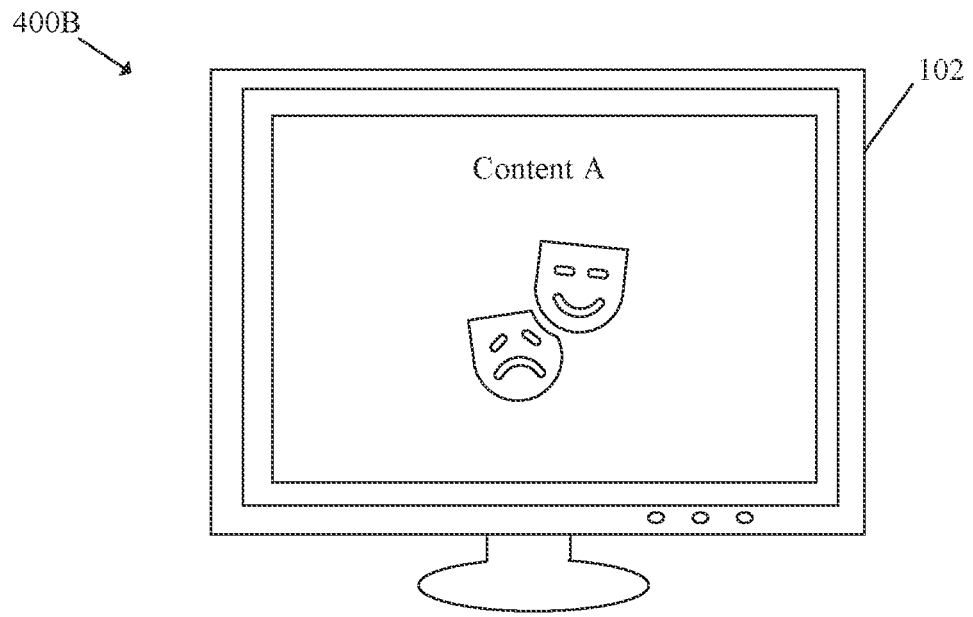

FIG. 4B is a diagram that illustrates an exemplary scenario for execution of a third-party application on an electronic device, in accordance with an embodiment of the disclosure. FIG. 4B is explained in conjunction with elements from FIGS. 1-3 and 4A. With reference to FIG. 4B, there is shown exemplary scenario 400B. In the exemplary scenario 400A, there is shown the electronic device 102 (such as a smart television or a digital media player) that may control the execution of the third-party application 114 for playback of content.

In the exemplary scenario 400B, based on the user input to select content A for streaming playback, the circuitry 202 may execute the third-party application 114 to access the network resource 110 using the one or more first network resource identifiers. For example, the third-party application 114 may be configured to access content (such as movies, television shows, news, gaming content) from the network resource 110. The third-party application 114 may access the selected content (such as content A) from the network resource 110 and begin streaming playback of content A on the electronic device 102. In an embodiment, the circuitry 202 execute the monitor application 112 to read the runtime code and/or the decrypted executable memory space of the third-party application 114 based on the execution of the third-party application 114. Based on the runtime code and/or the decrypted executable memory space of the third-party application 114, the monitor application 112 may identify the one or more requests to access the network resource 110 from the third-party application 114 during the playback of content A.

Figure 5:
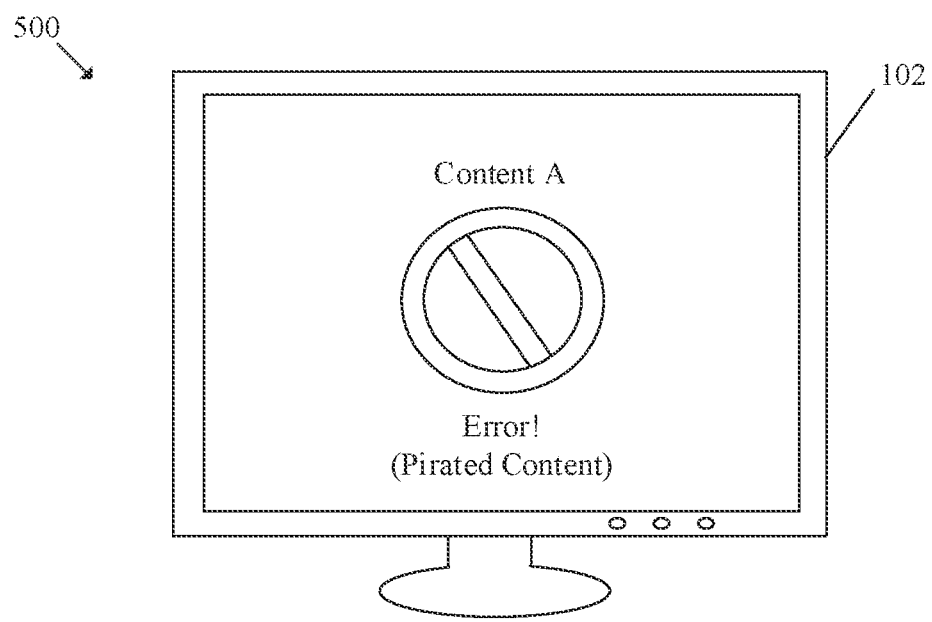
FIG. 5 is a diagram that illustrates an exemplary scenario for control of execution of a third-party application for anti-piracy control based on a blacklisting function, in accordance with an embodiment of the disclosure.

FIG. 5 is a diagram that illustrates an exemplary scenario for control of execution of a third-party application for anti-piracy control based on a blacklisting function, in accordance with an embodiment of the disclosure. FIG. 5 is explained in conjunction with elements from FIGS. 1-3, 4A, and 4B. With reference to FIG. 5, there is shown an exemplary scenario 500. In the exemplary scenario 500, there is shown the electronic device 102 (such as a smart television or a digital media player) that may control the execution of the third-party application 114 based on the blacklist 116.

In accordance with another embodiment, the circuitry 202 may extract a specific program code (such as a source code) of the third-party application 114 using the monitor application 112. The specific program code may be a signature code that indicates the type of the third-party application. The circuitry 202 may analyze the program code of the third-party application 114 to determine the type of the third-party application 114. For example, the circuitry 202 may compare the program code of the third-party applications with the sample program codes stored in the memory 206 and determine the type of the third-party application 114. Based on the determination that the type of the third-party application 114 is a player application, the circuitry 202 may extract the one or more first network resource identifiers for comparison with the blacklist 116.

In the exemplary scenario 500, the monitor application 112 may be configured to extract the one or more first network resource identifiers (such as URLs) from the one or more requests of the third-party application 114 during the playback of content A. The one or more first network resource identifiers may include a web address associated with the network resource 110. The monitor application 112 may periodically monitor the behavior of the third-party application 114 and may extract a second network resource identifier after a specific period of time from the extraction of the one or more first network resource identifiers during the playback of content A. (such as few minutes after the extraction of the one or more first network resource identifiers). The specific period of time may be predefined by a manufacturer of the electronic device 102. For example, the circuitry 202 may extract the second network resource identifier after every 10 minutes from the extraction of the one or more first network resource identifiers. The circuitry 202 may compare the extracted one or more first network resource identifiers and the second network resource identifier with the blacklist 116 associated with the monitor application 112. In an embodiment, the circuitry 202 may transmit the extracted one or more first network resource identifiers and the second network resource identifier to the server 106. The server 106 may search for the presence of the one or more first network resource identifiers and the second network resource identifier in the blacklist 116, and may transmit a search result back to the electronic device 102. In another embodiment, the circuitry 202 may search for the presence of the one or more first network resource identifiers and the second network resource identifier in a local version of the blacklist 116 stored in the memory 206. The circuitry 202 may determine that the network resource 110 that streams the selected content (such as content A) is a malicious resource, and may determine that content A is pirated content, in a case where the search result indicates that the one or more first network resource identifiers or the second network resource identifier are present in the blacklist 116.

In an embodiment, the circuitry 202 may be configured to terminate or suspend the execution of the third-party application 114 based on the determination that the one or more first network resource identifiers or the second network resource identifier are present in the blacklist 116. In another embodiment, the circuitry 202 may stop the playback of content A and may display a message (for example, "Error!") on the electronic device 102 indicating that content A is pirated content (as shown in FIG. 5). In another embodiment, the circuitry 202 may control a bandwidth available to the third-party application 114 to stream content (such as the content A) from the network resource 110. For example, the circuitry 202 may reduce the bandwidth available to stream the content A based on the determination that content A is pirated content, as described, for example in FIGS. 9A and 9B. On the other hand, the circuitry 202 may control the execution of the third-party application to continue playback of content A based on the determination that the one or more first network resource identifiers and/or the second network resource identifier are absent from the blacklist 116.

In accordance with another embodiment, the circuitry 202 may periodically extract the one or more requests from the third-party application 114 during the playback of the content. The circuitry 202 may extract the one or more network resource identifiers from each one or more requests. The circuitry 202 may determine whether the third-party application 114 switches between the one or more first network resource identifiers of a plurality of distributed network resource identifiers and a second network resource identifier of the plurality of distributed network resource identifiers. For example, the circuitry 202 may determine a change from the one or more first network resource identifiers to the second network resource identifier to access the content during the playback of the content. The circuitry 202 may terminate or suspend the execution of the third-party application 114 based on the switch between the one or more first network resource identifiers and the second network resource identifier. Details of the control of the third-party application 114 (such as a player application) based on the switch between the one or more first network resource identifiers and the second network resource identifier is further described, for example, in FIG. 10.

Figure 6:
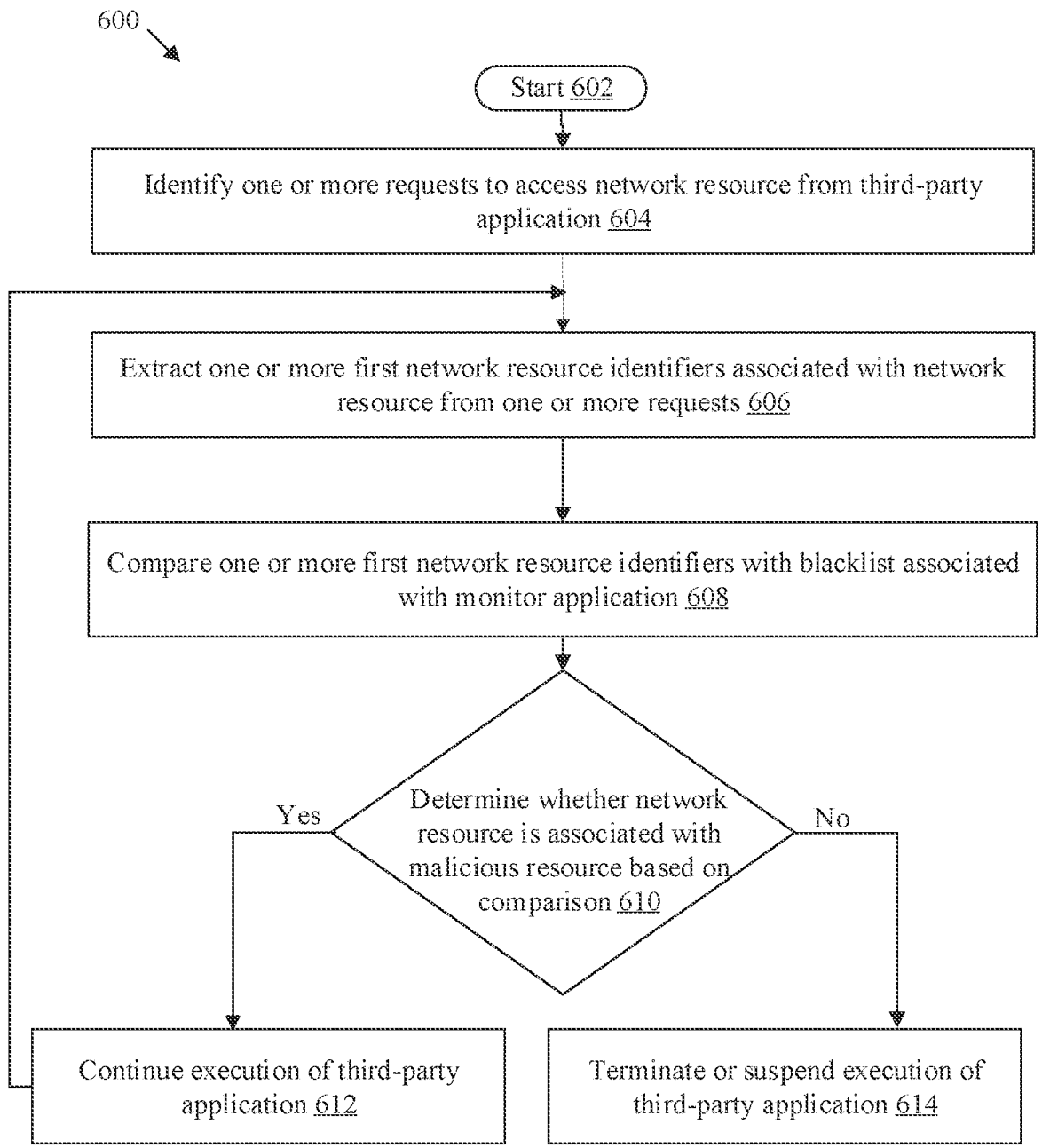
FIG. 6 is a flowchart that illustrates an exemplary method for control of execution of a third-party application based on a comparison of first network resource identifiers with a blacklist, in accordance with an embodiment of the disclosure.

FIG. 6 is a flowchart that illustrates an exemplary method for control of execution of a third-party application based on a comparison of first network resource identifiers with a blacklist, in accordance with an embodiment of the disclosure. FIG. 6 is explained in conjunction with elements from FIGS. 1-3, 4A, 4B, and 5. With reference to FIG. 6, there is shown an exemplary flowchart 600. The method illustrated in the exemplary flowchart 600 may be executed by any computing system, such as by the electronic device 102, or the circuitry 202. The method may start at 602 and proceed to 614.

At 604, one or more requests to access a network resource (such as the network resource 110) from a third-party application (such as the third-party application 114) may be identified. In accordance with an embodiment, the circuitry 202 may be configured to identify the one or more requests to access the network resource 110 from the third-party application 114. Details of the identification of the one or more requests from the third-party application 114 are provided, for example, in FIGS. 1, 4A, and 4B.

At 606, one or more network resource identifiers (such as the one or more first network resource identifiers) associated with the network resource 110 may be extracted from the one or more requests. In accordance with an embodiment, the circuitry 202 may be configured to extract the first one or more network resource identifiers associated with the network resource 110 from the one or more requests. Details of the extraction of the one or more first network resource identifiers from the one or more requests are provided, for example, in FIGS. 1, 4A, 4B, and 5.

At 608, the one or more first network resource identifiers may be compared with the blacklist 116 associated with the monitor application 112. In accordance with an embodiment, the circuitry 202 may compare the one or more first network resource identifiers with the blacklist 116. Details of the comparison between the one or more first network resource identifiers with the blacklist 116 are provided, for example, in FIGS. 1, 8A, and 8B.

At 610, a determination may be made whether the network resource 110 is associated with a malicious resource (such a network resource associated with the pirated content) based on the comparison. In accordance with an embodiment, the circuitry 202 may determine whether the network resource 110 is associated with the malicious resource based on the comparison of the one or more first network resource identifiers with the blacklist 116. Details of the determination of whether the network resource 110 is associated with the malicious resource based on the comparison are provided, for example, in FIGS. 1, 4A, and 4B. Based on the determination that the network resource 110 is associated with the malicious resource, the control passes to 614. Otherwise, the control passes to 612.

At 612, the execution of the third-party application 114 may be continued based on the determination that the network resource 110 is not associated with the malicious resource. In accordance with an embodiment, the circuitry 202 may be configured to continue the execution of the third-party application 114 based on the determination that the network resource 110 is not associated with the malicious resource. Details of the execution of the third-party application 114 based on the determination that the network resource 110 is not associated with the malicious resource are provided, for example, in FIGS. 1, 4A, and 4B. Control may pass back to 606.

At 614, the execution of the third-party application 114 may be terminated or suspended based on the determination that the network resource 110 is associated with the malicious resource. In accordance with an embodiment, the circuitry 202 may be configured to terminate or suspend the execution of the third-party application 114 based on the determination that the network resource 110 is associated with the malicious resource. Details of termination or suspension of the execution of the third-party application 114 based on the determination that the network resource 110 is associated with the malicious resource are provided, for example, in FIGS. 1, 4A, and 4B.

Figure 7:
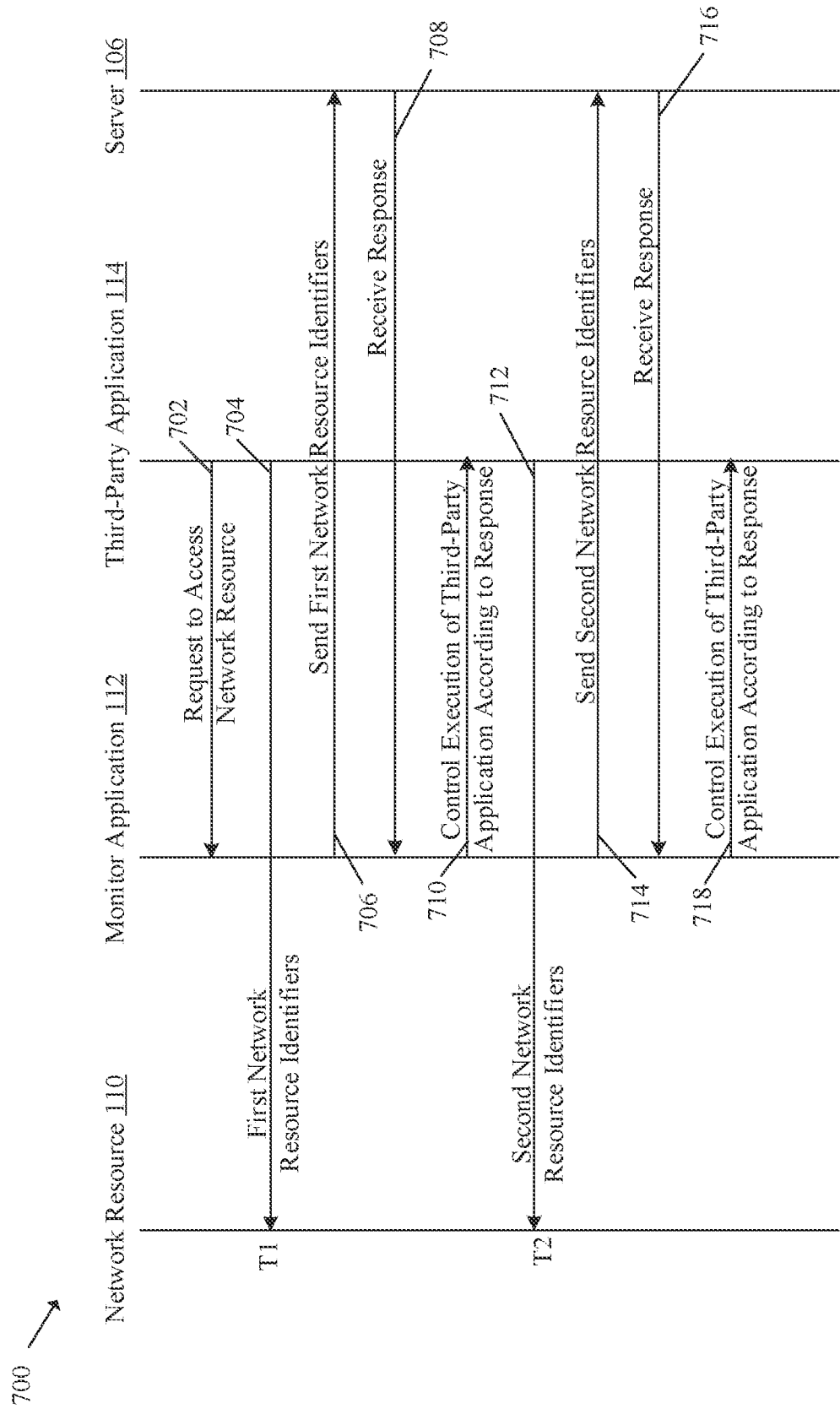
FIG. 7 is a timing diagram that illustrates exemplary operations of an electronic device for control of execution of a third-party application based on network resource identifiers extracted during execution of the third-party application, in accordance with an embodiment of the disclosure.

FIG. 7 is a timing diagram that illustrates exemplary operations of an electronic device for control of execution of a third-party application based on network resource identifiers extracted during execution of the third-party application, in accordance with an embodiment of the disclosure. FIG. 7 is explained in conjunction with elements from FIGS. 1-3, 4A, 4B, 5, and 6. With reference to FIG. 7, there is shown an exemplary timing diagram 700. In the exemplary timing diagram 700, there are shown the network resource 110, the monitor application 112, the third-party application 114, and the server 106. The electronic device 102 may be communicatively coupled with the network resource 110 and the server 106 through communication network 108.

At 702, the monitor application 112 may intercept a request to access a network resource (such as the network resource 110) from the third-party application 114 to acquire content for playback. For example, the third-party application 114 (such as a player application) may send the request to access the network resource 110 based on a playback request of the content on the electronic device 102. The monitor application 112 may have superuser privileges to read and/or intercept network calls made by the third-party application 114.

At 704, the third-party application 114 may transmit the one or more first network resource identifiers as part of a request to access the network resource 110. The third-party application 114 may transmit the one or more first network resource identifiers to the network resource 110 at the first time instant T1 when the third-party application 114 may initiate the playback of the content.

At 706, the monitor application 112 may extract the one or more first network resource identifiers and transmit the one or more first network resource identifiers to the server 106. The server 106 may compare the one or more first network resource identifiers with the blacklist 116. For example, the server 106 may determine whether the one or more first network resource identifiers are present in the blacklist 116.

At 708, the monitor application 112 may receive a response from the server 106 based on the comparison of the one or more first network resource identifiers with the blacklist 116. The response may include, but is not limited to, a result of the comparison of the one or more first network resource identifiers with the blacklist 116. For example, the response may indicate a positive result when the one or more first network resource identifiers are present in the blacklist 116, or may indicate a negative result when the one or more first network resource identifiers are not present in the blacklist 116.

At 710, the monitor application 112 may send a control instruction to the third-party application 114 based on the received response. The circuitry 202 may control, using the monitor application 112, the execution of the third-party application 114 according to the received response from the server 106. For example, the circuitry 202 may terminate or suspend the execution of the third-party application 114 (such as stop the streaming of the content A) when the monitor application 112 receives the positive result from the server 106. In another example, the circuitry 202 may block the one or more first network resource identifiers when the monitor application 112 receives the positive result from the server 106.

At 712, the third-party application 114 may transmit one or more second network resource identifiers as part of another request to access the network resource 110. The third-party application 114 may transmit the one or more first network resource identifiers to the network resource 110 at a second time instant T2 during the playback of the content.

At 714, the monitor application 112 may extract and transmit the one or more second network resource identifiers from the request at the second time instant T2. For example, the second time instant T2 may be after a specific period of time (such as 10-30 minutes) from T1. In another example, the second time instant T2 may be immediately after the blockage of the one or more first network resource identifiers. In an embodiment, the monitor application 112 may periodically extract one or more network resource identifiers after every specific period of time during the execution of the third-party application 114. The server 106 may compare the one or more second network resource identifiers with the blacklist 116. For example, the server 106 may determine whether the one or more second network resource identifiers are present in the blacklist 116.

At 716, the monitor application 112 may receive a response from the server 106 based on the comparison of the one or more second network resource identifiers with the blacklist 116. The response may include, but is not limited to, a result of the comparison of the one or more second network resource identifiers with the blacklist 116. For example, the response may indicate a positive result when the one or more second network resource identifiers are present in the blacklist 116, or may indicate a negative result when the one or more second network resource identifiers are not present in the blacklist 116.

At 718, the monitor application 112 may send a control instruction to the third-party application 114 based on the received response. The circuitry 202 may control, using the monitor application 112, the execution of the third-party application 114 according to the received response from the server 106. For example, the circuitry 202 may terminate or suspend the execution of the third-party application 114 (such as stop the stream of the content A) when the monitor application 112 receives the positive result from the server 106.

FIG. 8A is a block diagram that illustrates exemplary operations for comparison of network resource identifiers with a blacklist, in accordance with an embodiment of the disclosure. FIG. 8A is explained in conjunction with elements from FIGS. 1-3, 4A, 4B, and 5-7. With reference to FIG. 8A, there is shown an exemplary scenario 800A. In the exemplary scenario 800A, there is shown the electronic device 102 and the server 106. The electronic device 102 and the server 106 may be communicatively coupled through the communication network 108. The server 106 may include the blacklist 116.

In the exemplary scenario 800A, the circuitry 202 may transmit, using the monitor application 112, the one or more network resource identifiers to the server 106 through the communication network 108. The one or more network resource identifiers may correspond to one or more URLs used by the third-party application 114 to access the content selected by the user 104. The server 106 may compare the one or more network resource identifiers with the blacklist 116. For example, the server 106 may determine whether the one or more network resource identifiers are present in the blacklist 116. The server may further generate a result based on the comparison of the one or more network resource identifiers with the blacklist 116. The server 106 may transmit the result of the comparison to the electronic device 102 through the communication network 108.

The circuitry 202 may receive the result of the comparison from the server 106, and may control the execution of the third-party application 114 based on the received result of the comparison. For example, the circuitry 202 may terminate or suspend the execution of the third-party application 114 when the received result indicates that the one or more network resource identifiers are present in the blacklist 116. On the other hand, the circuitry 202 may continue the execution of the third-party application 114 when the received result indicates that the one or more network resource identifiers are not present in the blacklist 116.

FIG. 8B is a block diagram that illustrates exemplary operations for comparison of network resource identifiers with a blacklist, in accordance with an embodiment of the disclosure. FIG. 8B is explained in conjunction with elements from FIGS. 1-3, 4A, 4B, 5-7, and 8A. With reference to FIG. 8B, there is shown an exemplary scenario 800B. In the exemplary scenario 800B, there is shown the electronic device 102 and the server 106.

In the exemplary scenario 800B, the circuitry 202 may transmit a request for the blacklist 116 to the server 106 in a case where the third-party application 114 may make a network call to access the content, selected by the user 104, using one or more network resource identifiers. The circuitry 202 may transmit the request for the blacklist 116 through the communication network 108. In response to the request, the server 106 may transmit a copy of the blacklist 116 (such as the updated blacklist) to the electronic device 102. In an embodiment, the server 106 may transmit a copy of the blacklist 116 (such as the updated blacklist) to the electronic device 102 as a real-time update every time the blacklist 116 is updated.

The circuitry 202 may receive the blacklist 116 from the server 106 through the communication network 108. The circuitry 202 may compare the one or more network resource identifiers with the received blacklist 116. For example, the circuitry 202 may determine whether URLs or IP addresses or domain names used to access the selected content are present in the blacklist 116. The circuitry 202 may control the execution of the third-party application 114 based on the comparison.

Figure 9A:
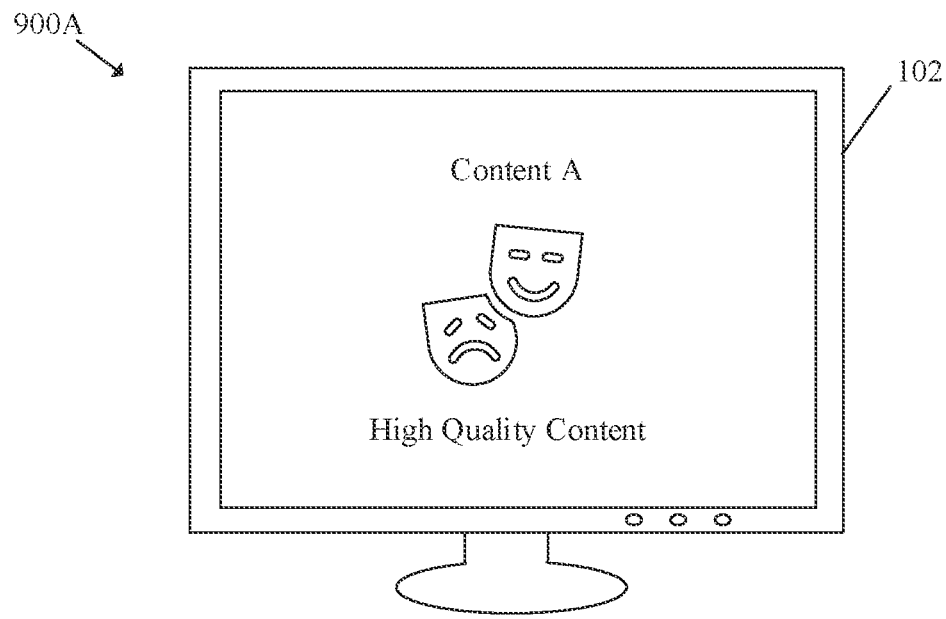
FIGS. 9A and 9B are diagrams that illustrate exemplary scenarios for control of bandwidth and performance of a third-party application for anti-piracy control, in accordance with an embodiment of the disclosure.

FIG. 9A is a diagram that illustrates an exemplary scenario for control of bandwidth and performance of a third-party application for anti-piracy control, in accordance with an embodiment of the disclosure. FIG. 9A is explained in conjunction with elements from FIGS. 1-3, 4A, 4B, 5-7, 8A, and 8B. With reference to FIG. 9A, there is shown an exemplary scenario 900A. In the exemplary scenario 900A, there is shown the electronic device 102 (such as a smart television or a digital media player) that may control the execution of the third-party application 114 (such as playback of media content).

In the exemplary scenario 900A, the circuitry 202 may be configured to receive, from the user 104, the playback request to stream content A (as shown in FIG. 4A). Examples of content A may include, but are not limited to, video content, audio content, audio-video content, and so on. The circuitry 202 may execute the third-party application 114 to stream high-quality content A. The third-party application 114 may require higher bandwidth to stream the high-quality content A.

Figure 9B:
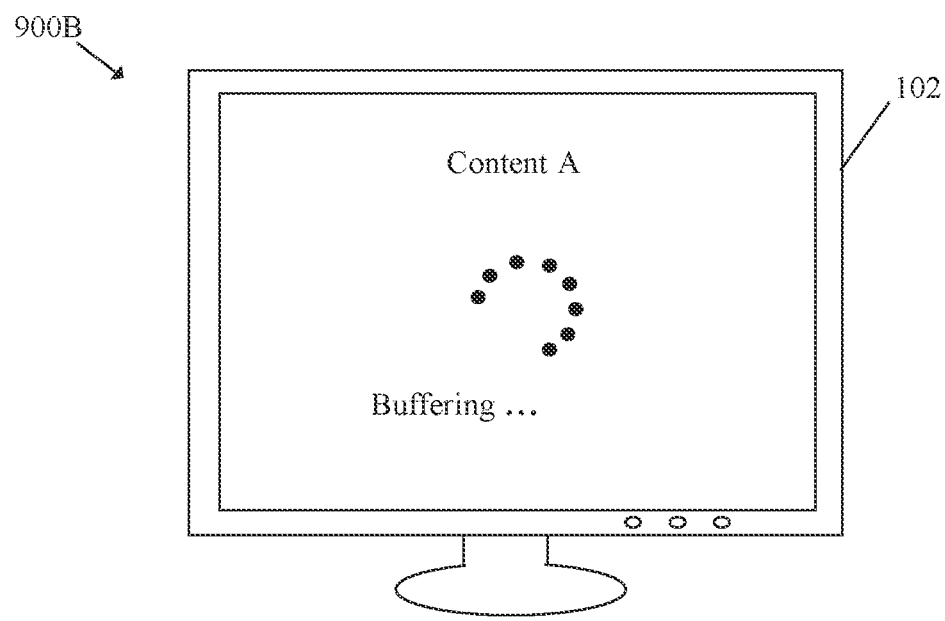

FIG. 9B is a diagram that illustrates an exemplary scenario for control of bandwidth and performance of a third-party application for anti-piracy control, in accordance with an embodiment of the disclosure. FIG. 9B is explained in conjunction with elements from FIGS. 1-3, 4A, 4B, 5-7, 8A, 8B, and 9A. With reference to FIG. 9B, there is shown an exemplary scenario 900B. In the exemplary scenario 900B, there is shown the electronic device 102 (such as a smart television or a digital media player) that may control the execution of the third-party application 114 (such as playback of media content).

In the exemplary scenario 900B, the circuitry 202 may compare the one or more first network resource identifiers used by the third-party application 114 to access content A with the blacklist 116. For example, the circuitry 202 may determine that content A is pirated content when the one or more first network resource identifiers used to access content A are present in the blacklist 116. The circuitry 202 may control the bandwidth available to the third-party application 114 to stream content A based on the presence of the one or more first network resource identifiers in the blacklist 116. For example, the circuitry 202 may reduce the bandwidth available to third-party application 114 to stream content A such that the buffering time of the content is undesirably increased. In another example, the reduction of the bandwidth available to the third-party application 114 may reduce the quality (such as resolution) of content A to lowest quality (for example, 360p resolution or lower).

In another embodiment, the circuitry 202 may control (or degrade) a performance of the third-party application 114 or interrupt the playback of the content A by the third-party application based on the presence of the one or more first network resource identifiers in the blacklist 116. For example, the circuitry 202 may display a pop-up message (such as an error message or a warning message) on the electronic device 102 by interruption of the playback of content A. In another example, the circuitry 202 may frequently stop the playback of content A by the third-party application 114, thereby discouraging the user 104 from using the third-party application 114 (such as the pirate application).

Figure 10:
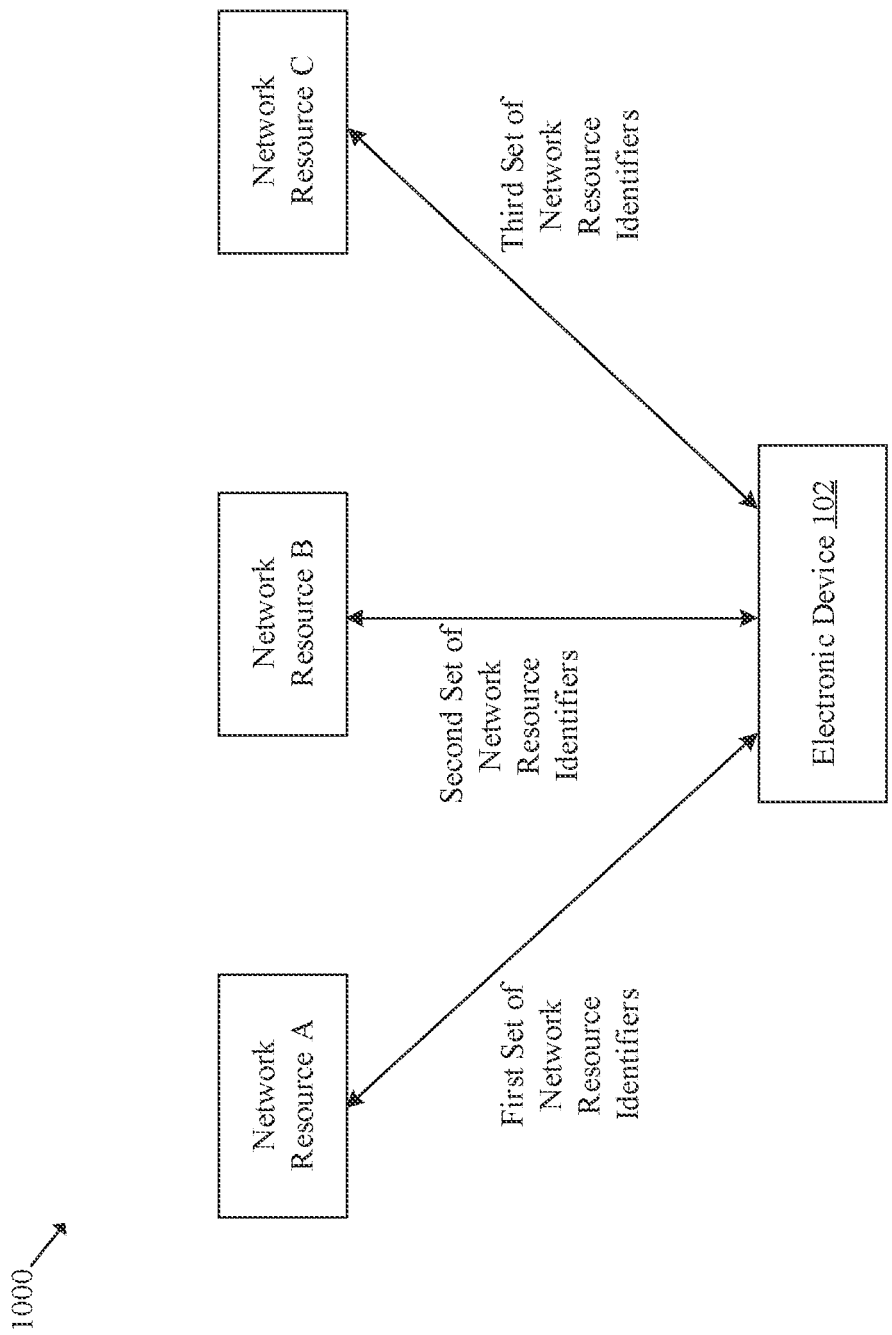
FIG. 10 is a block diagram that illustrates exemplary operations for control of the execution of the third-party application based on a switch between a plurality of distributed network resource identifiers, in accordance with an embodiment of the disclosure.

FIG. 10 is a block diagram that illustrates exemplary operations for control of the execution of the third-party application based on a switch between a plurality of distributed network resource identifiers, in accordance with an embodiment of the disclosure. FIG. 10 is explained in conjunction with elements from FIGS. 1-3, 4A, 4B, 5-7, 8A, 8B, 9A, and 9B. With reference to FIG. 10, there is shown an exemplary block diagram 1000. In the exemplary block diagram 1000, there are shown the electronic device 102 and a plurality of distributed network resources (such as a first network resource A, a second network resource B, and a third network resource C).

The circuitry 202 may periodically extract one or more network resource identifiers during the execution of the third-party application 114. The third-party application 114 may be associated with networked file sharing service (such as a content delivery network (CDN)) that may include a plurality distributed network resource identifiers (such as distributed URLs). The third-party application 114 may access content from different network resources. For example, the third-party application 114 may access a first part of the content from the first network resource A, and may access a second part of the content from the second network resource B, and may access a third part of the content from the third network resource C. The circuitry 202 may extract a first set of network resource identifiers (such as a first set of URLs) used by the third-party application 114 to access the network resource A during the playback of content A by the third-party application 114. The circuitry 202 may determine that the first set of network resource identifiers is blacklisted based on the blacklist 116. The circuitry 202 may block the first set of network resource identifiers to stop the playback of content A by the third-party application 114.

Based on the blockage of the first set of network resource identifiers, the third-party application 114 may then switch to a second set of network resource identifiers (such as a second set of URLs) to access the remainder of content A from the second network resource B. The circuitry 202 may determine whether the third-party application 114 has switched to the set of second network resource identifiers using the monitor application 112.

The circuitry 202 may terminate or suspend the execution of the third-party application 114 based on the switch from the first set of network resource identifiers to the second set of network resource identifiers by the third-party application 114. The circuitry 202 may further block the second set of network resource identifiers to stop the playback of content A by the third-party application 114. In an embodiment, the circuitry 202 may record the second set of network resource identifiers in the memory 206 or update the local version of blacklist 116. The circuitry 202 may then report the second set of network resource identifiers or the updated blacklist to an enforcement group over the communication network 108. For example, the circuitry 202 may transmit the second set of network resource identifiers or the updated blacklist to the server 106.

Based on the blockage of the second set of network resource identifiers, the third-party application 114 may then switch to a third set of network resource identifiers (such as a second set of URLs) to access the remainder of content A from the third network resource B. The circuitry 202 may determine whether the third-party application 114 has switched to the third set of network resource identifiers using the monitor application 112.

The circuitry 202 may terminate or suspend the execution of the third-party application 114 based on the switch from the second set of network resource identifiers to the third set of network resource identifiers by the third-party application 114. The circuitry 202 may further block the third set of network resource identifiers to stop the playback of content A by the third-party application 114. In an embodiment, the circuitry 202 may record the third set of network resource identifiers in the memory 206 or update the local version of blacklist 116. The circuitry 202 may then report the third set of network resource identifiers or the updated blacklist to the enforcement group over the communication network 108. For example, the circuitry 202 may transmit the third set of network resource identifiers or the updated blacklist to the server 106, thereby globally updating the blacklist 116.

Figure 11:
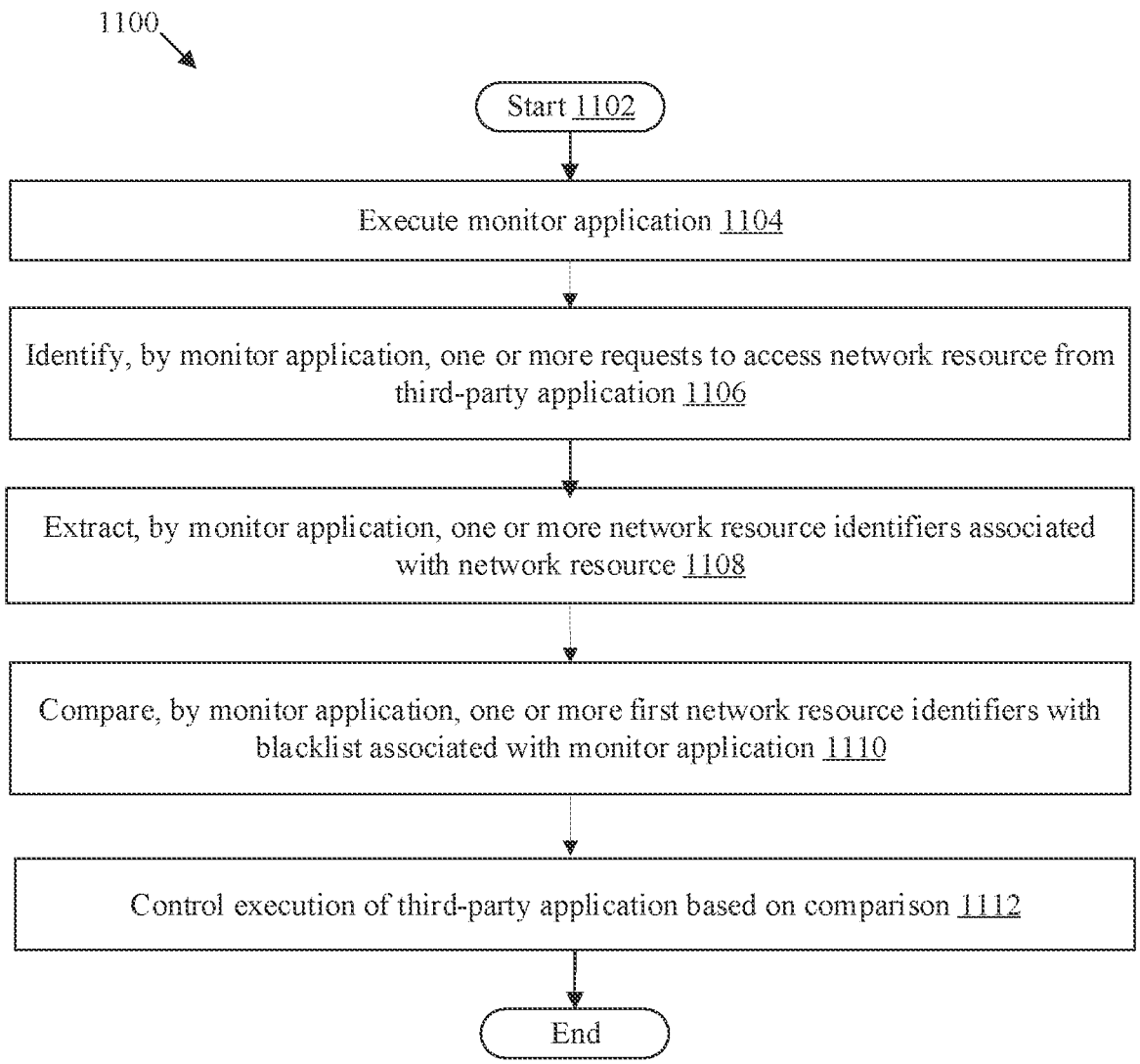
FIG. 11 is a flowchart that illustrates an exemplary method for control of execution of a third-party application for anti-piracy control based on a blacklisting function, in accordance with an embodiment of the disclosure.

FIG. 11 is a flowchart that illustrates an exemplary method for control of execution of a third-party application for anti-piracy control based on a blacklisting function, in accordance with an embodiment of the disclosure. FIG. 11 is explained in conjunction with elements from FIGS. 1-3, 4A, 4B, 5-7, 8A, 8B, 9A, 9B, and 10. With reference to FIG. 11, there is shown a flowchart 1100. The method illustrated in the flowchart 1100 may be executed by any computing system, such as by the electronic device 102, or the circuitry 202. The method may start at 1102 and may proceed to 1112.

At 1104, a monitor application (such as the monitor application 112) may be executed. In accordance with an embodiment, the circuitry 202 may be configured to execute the monitor application 112. Details of the execution of the monitor application 112 are provided, for example, in FIGS. 1 and 2.

At 1106, one or more requests to access a network resource (such as the network resource 110) from a third-party application (such as the third-party application 114) may be identified by the monitor application 112. In accordance with an embodiment, the circuitry 202 may be configured to identify the one or more requests to access the network resource 110 from the third-party application 114. Details of the identification of the one or more requests from the third-party application 114 are provided, for example, in FIGS. 1, 4A, 4B, and 6.

At 1108, one or more network resource identifiers (such as the one or more first network resource identifiers) associated with the network resource 110 may be extracted by the monitor application 112 from the one or more requests. In accordance with an embodiment, the circuitry 202 may be configured to extract the first one or more network resource identifiers associated with the network resource 110 from the one or more requests. Details of the extraction of the one or more first network resource identifiers from the one or more requests are provided, for example, in FIGS. 1, 4A, 4B, 5, and 6.

At 1110, the one or more first network resource identifiers may be compared with a blacklist (such as the blacklist 116) associated with the monitor application 112 by the monitor application 112. In accordance with an embodiment, the circuitry 202 may compare the one or more first network resource identifiers with the blacklist 116. Details of the comparison between the one or more first network resource identifiers with the blacklist 116 are provided, for example, in FIGS. 1, 8A, and 8B.

At 1112, execution of the third-party application 114 may be controlled based on the comparison between the one or more first network resource identifiers and the blacklist 116. In accordance with an embodiment, the circuitry 202 may control the execution of the third-party application 114 based on the comparison. Details of the control of the execution of the third-party application 114 based on the comparison are provided, for example, in FIGS. 1, 4A, 4B, 5-7, 9A, and 9B.

Although the flowchart 1100 is illustrated as discrete operations, such as 1102, 1104, 1106, 1108, 1110, and 1112, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, instructions executable by a machine and/or a computer to operate a system (such as the electronic device 102 or the circuitry 202) for anti-piracy control based on a blacklisting function. The instructions may cause the machine and/or computer to perform operations that may include executing, a monitor application 112 that may be a part of the OS of the electronic device 102. The operations may further include identifying, by the monitor application 112, one or more first requests to access a network resource 110 from a third-party application 114 installed in the electronic device 102. The operations may further include extracting, by the monitor application 112, one or more first network resource identifiers associated with the network resource 110 from the one or more requests. The operations may further include comparing, by the monitor application 112, the one or more first network resource identifiers with a blacklist 116 associated with the monitor application 112. The operations may further include controlling, by the monitor application 112, an execution of the third-party application 114 based on the comparison of the one or more first network resource identifiers with the blacklist 116.

Various embodiments of the disclosure may provide an electronic device (such as the electronic device 102) for control of an execution of a third-party application (such as a media player) for anti-piracy control based on a blacklisting function. The electronic device 102 may include circuitry (such as the circuitry 202) that is communicatively coupled to a network resource (such as the network resource 110) and a server (such as the server 106) that stores a blacklist (such as the blacklist 116). The circuitry 202 may be configured to execute a monitor application (such as the monitor application 112). The monitor application 112 may be a part of the OS of the electronic device 102. The circuitry 202 may be configured to identify, by the monitor application 112, one or more requests to access the network resource 110 from a third-party application (such as the third-party application 114) installed on the electronic device 102. The circuitry 202 may be configured to extract, by the monitor application 112, one or more network first resource identifiers associated with the network resource 110 from the one or more requests. The circuitry 202 may be configured to compare, by the monitor application 112, the one or more first network resource identifiers with the blacklist 116 associated with the monitor application 112. The circuitry 202 may be configured to control, by the monitor application 112, an execution of the third-party application 114 based on the comparison of the one or more network resource identifiers with the blacklist 116.

In accordance with an embodiment, the circuitry 202 may be configured to determine that the network resource 110 is associated with a malicious resource (such as a network resource corresponding to pirated content) based on the comparison. The circuitry 202 may terminate or suspend the execution of the third-party application 114 (such as a pirate application) based on the determination that the network resource 110 is associated with the malicious resource. The circuitry 202 may be configured to identify the one or more requests from the third-party application 114 during the execution of the third-party application 114.

In accordance with an embodiment, the circuitry 202 may be configured to determine, based on an analysis of a specific program code of the third-party application 114, whether a type of the third-party application 114 is a player application that streams content from the network resource 110 onto the electronic device 102. The circuitry 202 may compare the one or more first network resource identifiers with the blacklist 116 based on the determination that the type of the third-party application 114 is the player application.

In accordance with an embodiment, the circuitry 202 may transmit the one or more first network resource identifiers to a server (such as the server 106) that stores the blacklist 116. The server 106 may compare the one or more first network resource identifiers with the stored blacklist 116. The circuitry 202 may receive a result of the comparison from the server 106. The circuitry 202 may control the execution of the third-party application 114 based on the received result of the comparison. In another embodiment, the circuitry 202 may receive the blacklist 116 from the server 106. The blacklist 116 may include a list of malicious IP addresses or a list of malicious domain names. The circuitry 202 may compare the one or more first network resource identifiers with the blacklist 116 received from the server 106.

In accordance with an embodiment, the circuitry 202 may be configured to control a bandwidth available to the third-party application 114 to stream content (such as content A) from the network resource 110. The circuitry 202 may control the bandwidth based on the comparison of the one or more first network resource identifiers with the blacklist 116. The circuitry 202 may further control one of a performance of the third-party application 114 or interrupt playback (such as frequently pause or stop the playback) of the content (such as content A) based on the comparison of the one or more first network resource identifiers with the blacklist 116.

In accordance with an embodiment, the circuitry 202 may be configured to extract one or more second network resource identifiers from the one or more requests during the stream of the content. The one or more second network resource identifiers may be extracted after a specific period of time from the extraction of the one or more first network resource identifiers. The circuitry 202 may compare the one or more second network resource identifiers with the blacklist 116. The circuitry 202 may terminate or suspend the execution of the third-party application 114 based on the comparison of the one or more second network resource identifiers with the blacklist 116.

In accordance with an embodiment, the circuitry 202 may be configured to determine the network resource 110 is a part of a file sharing service associated with a plurality of distributed network resource identifiers. The circuitry 202 may determine whether the third-party application 114 switches between the one or more first network resource identifiers of the plurality of distributed network resource identifiers and a second network resource identifier of the plurality of distributed network resource identifiers. The circuitry 202 may terminate or suspend the execution of the third-party application 114 based on the switch between the one or more first network resource identifiers and the second network resource identifier. The circuitry 202 may be configured to update the blacklist 116 based on the switch between the one or more first network resource identifiers and the second network resource identifier.

In accordance with an embodiment, the circuitry 202 may be configured to determine a signature of the third-party application 114, and may prevent an installation of the third-party application 114 based on the signature of the third-party application 114. In accordance with an embodiment, the circuitry 202 may determine a change from a first network interface of the electronic device 102 to a second network interface by the third-party application 114. The circuitry 202 may control the execution of the third-party application 114 based on the determined change.

In accordance with an embodiment, the monitor application 112 may be associated with a manufacturer of the electronic device 102. The privileged access permission of the monitor application 112 may comprises root access on the electronic device 102.

The foregoing description of embodiments and examples has been presented for purposes of illustration and description. It is not intended to be exhaustive or limiting to the forms described. Numerous modifications are possible considering the above teachings. Some of those modifications have been discussed and others will be understood by those skilled in the art. The embodiments were chosen and described for illustration of various embodiments. The scope is not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. An electronic device, comprising:
   circuitry configured to:
   execute a monitor application, wherein the monitor application is part of an operating system of the electronic device;
   identify, by the monitor application, one or more requests to access a network resource from a third-party application installed on the electronic device, wherein
   the third-party application includes a media player application,
   the one or more requests are identified from a runtime code of the third-party application, and
   the monitor application has privileged access permission to read the runtime code of the third-party application;
   extract, by the monitor application, one or more first network resource identifiers associated with the network resource from the one or more requests;
   compare, by the monitor application, the one or more first network resource identifiers with a blacklist associated with the monitor application;
   control, by the monitor application, an execution of the third-party application to reduce a bandwidth available to the third-party application to stream content from the network resource during playback of the content by the third-party application, wherein the control is based on the comparison of the one or more first network resource identifiers with the blacklist;
   determine whether the third-party application switches between the one or more first network resource identifiers of a plurality of distributed network resource identifiers and a second network resource identifier of the plurality of distributed network resource identifiers; and
   terminate or suspend or degrade the execution of the third-party application based on the switch between the one or more first network resource identifiers and the second network resource identifier.

2. The electronic device according to claim 1, wherein the circuitry is further configured to:
   determine that the network resource is associated with a malicious resource based on the comparison; and
   terminate or suspend or degrade the execution of the third-party application based on the determination that the network resource is associated with the malicious resource.

3. The electronic device according to claim 1, wherein the circuitry is further configured to identify the one or more requests during the execution of the third-party application.

4. The electronic device according to claim 1, wherein the circuitry is further configured to:
   determine that a type of the third-party application is the media player application based on a specific code of the third-party application, wherein the media player application streams the content from the network resource onto the electronic device; and
   compare the one or more first network resource identifiers with the blacklist based on the determination that the type of the third-party application is the media player application.

5. The electronic device according to claim 1, wherein the circuitry is further configured to:
   transmit the one or more first network resource identifiers to a server that stores the blacklist, wherein the server compares the one or more first network resource identifiers with the stored blacklist;
   receive, from the server, a result of the comparison of the one or more first network resource identifiers with the stored blacklist; and
   control the execution of the third-party application based on the received result.

6. The electronic device according to claim 1, wherein the circuitry is further configured to receive the blacklist from a server, and
the blacklist comprises at least one of a list of malicious internet protocol (IP) addresses or a list of malicious domain names.

7. The electronic device according to claim 1, wherein the reduction of the bandwidth is based on the comparison of the one or more first network resource identifiers with the blacklist.

8. The electronic device according to claim 7, wherein the circuitry is further configured to one of degrade a performance of the third-party application or interrupt the playback of the content by the third-party application.

9. The electronic device according to claim 7, wherein the circuitry is further configured to:
   extract one or more second network resource identifiers from the one or more requests during the stream of the content, wherein the one or more second network resource identifiers are extracted after a specific period of time from the extraction of the one or more first network resource identifiers;
   compare the one or more second network resource identifiers with the blacklist; and
   terminate or suspend the execution of the third-party application based on the comparison of the one or more second network resource identifiers with the blacklist.

10. The electronic device according to claim 1, wherein the circuitry is further configured to determine the network resource is a part of a file sharing service associated with the plurality of distributed network resource identifiers.

11. The electronic device according to claim 1, wherein the circuitry is further configured to update the blacklist based on the one or more first network resource identifiers and the second network resource identifier.

12. The electronic device according to claim 1, wherein the circuitry is further configured to prevent an installation of the third-party application based on a signature of the third-party application.

13. The electronic device according to claim 1, wherein the circuitry is further configured to:
   determine a change from a first network interface of the electronic device to a second network interface by the third-party application; and
   control the execution of the third-party application based on the determined change.

14. The electronic device according to claim 1, wherein the monitor application is associated with a manufacturer of the electronic device, and
   the privileged access permission comprises root access on the electronic device.

15. A method, comprising:
   in an electronic device:
      executing a monitor application, wherein the monitor application is part of an operating system of the electronic device;
      identifying, by the monitor application, one or more requests to access a network resource from a third-party application installed on the electronic device, wherein
         the third-party application includes a media player application,
         the one or more requests are identified from a runtime code of the third-party application, and
         the monitor application has privileged access permission to read the runtime code of the third-party application;
      extracting, by the monitor application, one or more first network resource identifiers associated with the network resource from the one or more requests;
      comparing, by the monitor application, the one or more first network resource identifiers with a blacklist associated with the monitor application;
      controlling, by the monitor application, an execution of the third-party application to reduce a bandwidth available to the third-party application to stream content from the network resource during playback of the content by the third-party application, wherein the control is based on the comparison of the one or more first network resource identifiers with the blacklist;
      determining whether the third-party application switches between the one or more first network resource identifiers of a plurality of distributed network resource identifiers and a second network resource identifier of the plurality of distributed network resource identifiers; and
      terminating or suspending or degrading the execution of the third-party application based on the switch between the one or more first network resource identifiers and the second network resource identifier.

16. The method according to claim 15, further comprising:
   determining a type of the third-party application is the media player application based on a specific code of the third-party application, wherein the media player application streams content from the network resource onto the electronic device; and
   comparing the one or more first network resource identifiers with the blacklist based on the determination that the type of the third-party application is the media player application.

17. The method according to claim 15, wherein the reduction of the bandwidth is based on the comparison of the one or more first network resource identifiers with the blacklist.

18. The method according to claim 17, further comprising:
   extracting one or more second network resource identifiers from the one or more requests during the stream of the content, wherein the one or more second network resource identifiers are extracted after a specific period of time from the extraction of the one or more first network resource identifiers;
   comparing the one or more second network resource identifiers with the blacklist; and
   terminating or suspending the execution of the third-party application based on the comparison of the one or more second network resource identifiers with the blacklist.

19. A non-transitory computer-readable medium having stored thereon, computer-executable instructions which, when executed by a processor of an electronic device, cause the processor to execute operations, the operations comprising:
   executing a monitor application, wherein the monitor application is part of an operating system of the electronic device;
   identifying, by the monitor application, one or more requests to access a network resource from a third-party application installed on the electronic device, wherein
      the third-party application includes a media player application,
      the one or more requests are identified from a runtime code of the third-party application, and
      the monitor application has privileged access permission to read the runtime code of the third-party application;

extracting, by the monitor application, one or more first network resource identifiers associated with the network resource from the one or more requests;

comparing, by the monitor application, the one or more first network resource identifiers with a blacklist associated with the monitor application;

controlling, by the monitor application, an execution of the third-party application to reduce a bandwidth available to the third-party application to stream content from the network resource during playback of the content by the third-party application, wherein the control is based on the comparison of the one or more first network resource identifiers with the blacklist;

determining whether the third-party application switches between the one or more first network resource identifiers of a plurality of distributed network resource identifiers and a second network resource identifier of the plurality of distributed network resource identifiers; and terminating or suspending or degrading the execution of the third-party application based on the switch between the one or more first network resource identifiers and the second network resource identifier.

* * * * *